United States Patent [19]
Miyagawa et al.

[11] Patent Number: 5,475,662
[45] Date of Patent: Dec. 12, 1995

[54] OPTICAL DISC APPARATUS WITH TRACKING ERROR COMPENSATION

[75] Inventors: Naoyasu Miyagawa, Suita; Yasuhiro Gotoh, Kadoma, both of Japan

[73] Assignee: Matsushita Electric Industrial Co., Ltd., Japan

[21] Appl. No.: 175,352

[22] PCT Filed: May 13, 1993

[86] PCT No.: PCT/JP93/00630

§ 371 Date: Jan. 5, 1994

§ 102(e) Date: Jan. 5, 1994

[87] PCT Pub. No.: WO93/23848

PCT Pub. Date: Nov. 25, 1993

[30] Foreign Application Priority Data

May 13, 1992 [JP] Japan ..................... 4-120223

[51] Int. Cl.⁶ ................................ G11B 7/00
[52] U.S. Cl. ................... 369/44.26; 369/44.32; 369/44.42; 369/122
[58] Field of Search ................ 369/32, 58, 54, 369/47, 44.26, 48, 44.32, 44.42, 121, 122, 59

[56] References Cited

U.S. PATENT DOCUMENTS

| | | | |
|---|---|---|---|
| 4,423,502 | 12/1983 | Dil | 369/275.1 |
| 5,134,607 | 7/1992 | Fuji et al. | 369/121 |
| 5,199,022 | 3/1993 | Suzuki et al. | 369/59 |
| 5,199,023 | 3/1993 | Yamamoto et al. | 369/275.4 |
| 5,343,454 | 8/1994 | Watanabe et al. | 369/44.32 |
| 5,351,226 | 9/1994 | Mizumoto et al. | 369/32 |

FOREIGN PATENT DOCUMENTS 0376626 7/1990 European Pat. Off. .
51-91611 8/1976 Japan .
57-050330 3/1982 Japan .
57-205830 12/1982 Japan .
58-147823 2/1983 Japan .
58-159685 10/1983 Japan .
59-168939 9/1984 Japan .
63-66734 3/1988 Japan .
63-173236 7/1988 Japan .
63-57859 11/1988 Japan .

OTHER PUBLICATIONS

"High Track Density Magneto–Optical Recording Using a Crosstalk Canceller" by K. Kayanuma et al; SPIE vol. 1316 Optical Data Storage (1990); pp. 35–39.

Primary Examiner—Georgia Y. Epps
Assistant Examiner—Nabil Hindi
Attorney, Agent, or Firm—Parkhurst, Wendel & Rossi

[57] ABSTRACT

An optical disc apparatus, which uses an optical disc having a signal recorded on both hollow and convex portions of tracks, provides stable tracking control. An offset judging circuit judges whether the signal has been recorded only on either of two recording regions adjacent in a vertical direction to the track direction. An offset application circuit applies an offset voltage to an error signal on the basis of a control signal output in accordance with the result of the offset judging means. This effectively cancels an offset in the tracking error signal caused by the existence of recording pits only on an inner circumference side or outer circumference side of an adjacent recording track to provide stable tracking control. Moreover, addresses of presently recorded regions are stored in a recorded address control memory, so that detection that the signal has been recorded on either of two adjacent recording regions can be performed with a simple structure.

17 Claims, 20 Drawing Sheets

8 RECORDING TRACK
9 OPTICAL DISK
15 ACTUATOR

FIG. 5

| I1 | I2 | T | O |
|----|----|---|---|
| Lo | Lo | ↳ | J2 |
| Hi | Lo | ↳ | J1 |
| Lo | Hi | ↳ | J3 |
| Hi | Hi | ↳ | J2 |

1 RECORDING LAYER
2 RECORDING MARK
3 FORCUS SPOT
4 HOLLOW PORTION
5 CONVEX PORTION
6 ADDRESS PIT

PRIOR ART FIG. 15

1 RECORDING LAYER
2 RECORDING MARK
3 FOCUS SPOT
40 HOLLOW PORTION
41 CONVEX PORTION

1 RECORDING LAYER
2 RECORDING MARK
3 FOCUS SPOT
40 HOLLOW PORTION
41 CONVEX PORTION

FIG 18 (a) PRIOR ART
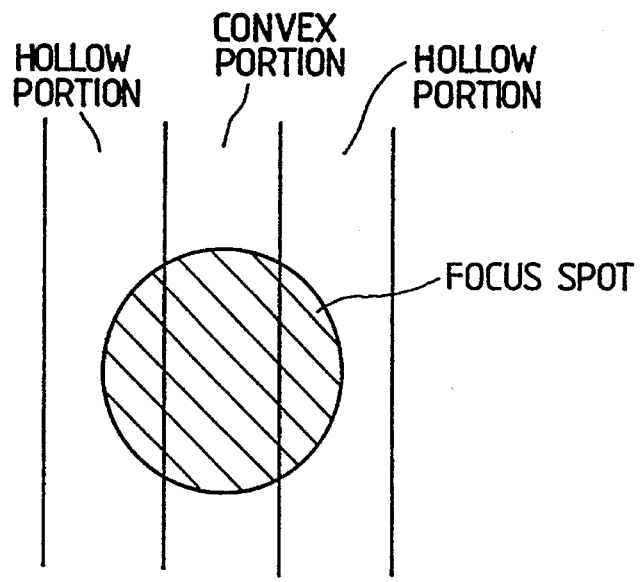
FIG. 18 (b) PRIOR ART
FIG. 18 (c) PRIOR ART
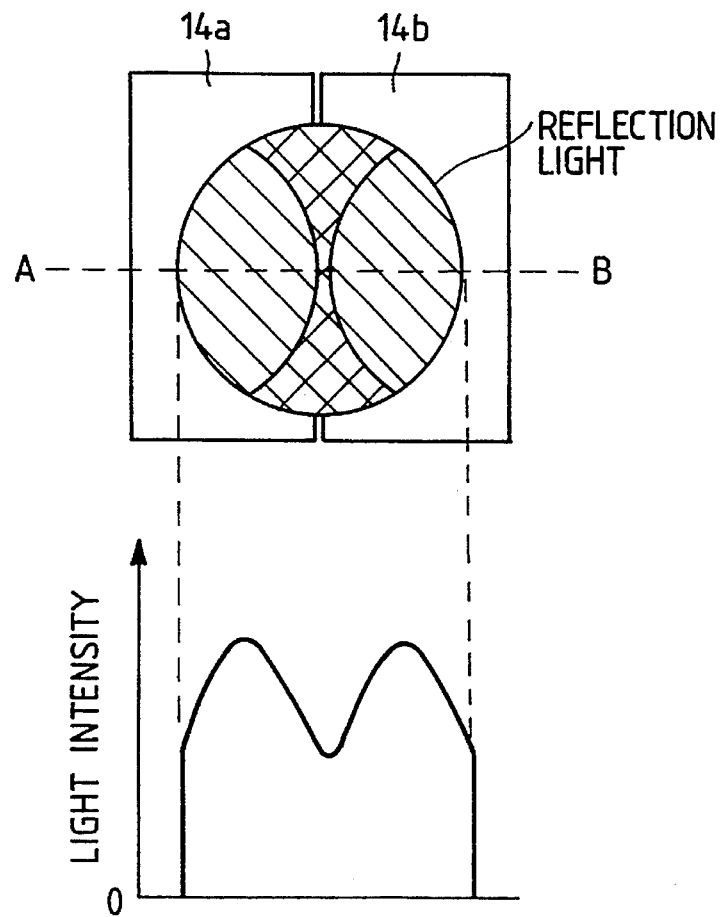

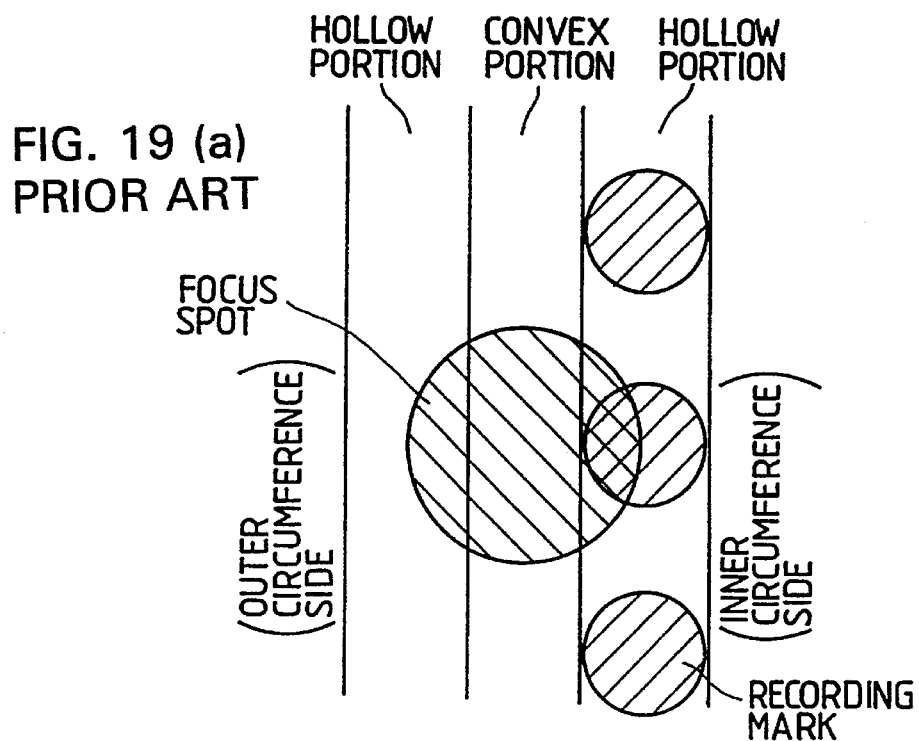
FIG. 19 (a) PRIOR ART
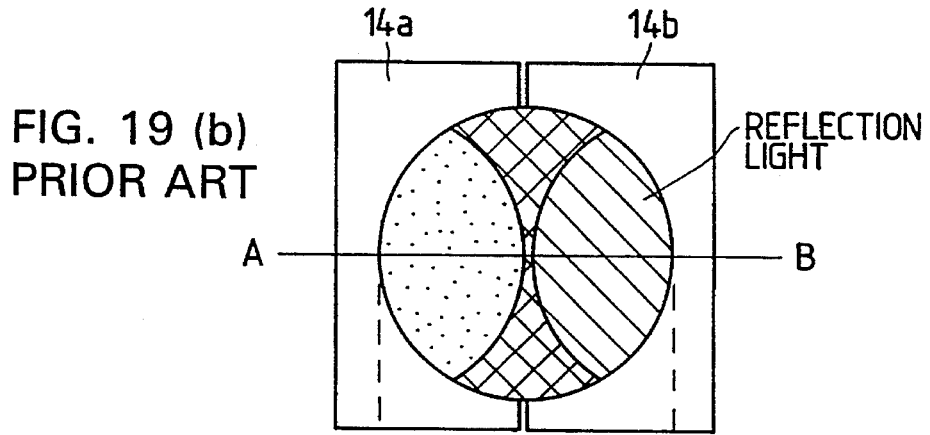
FIG. 19 (b) PRIOR ART
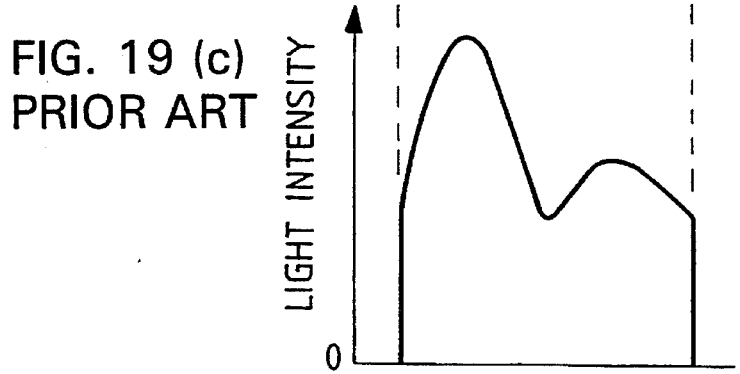
FIG. 19 (c) PRIOR ART FIG. 20 PRIOR ART
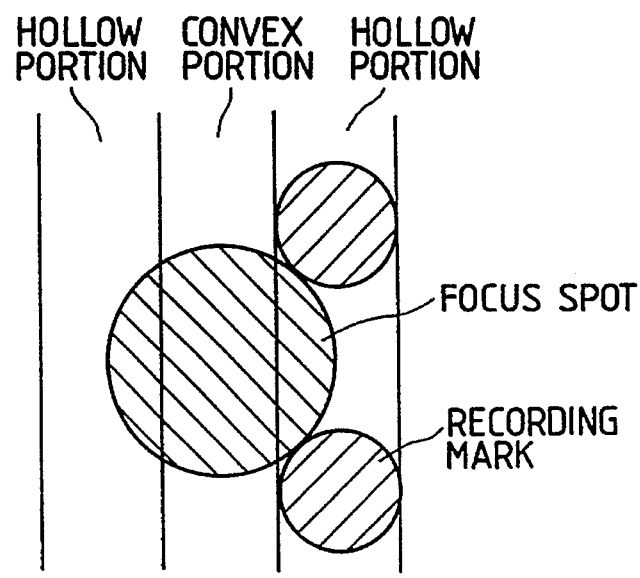
FIG. 21 PRIOR ART
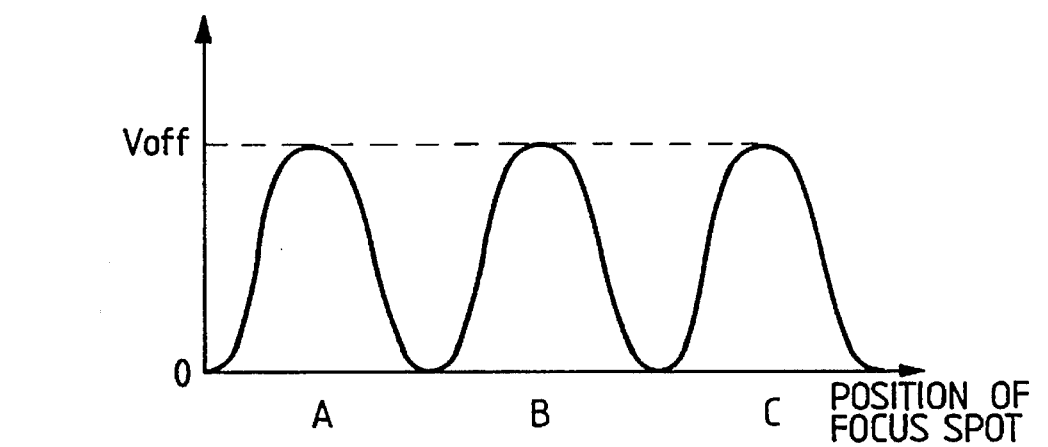
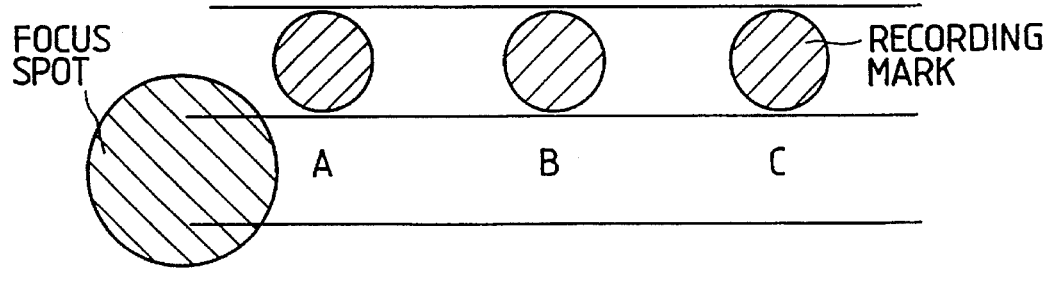

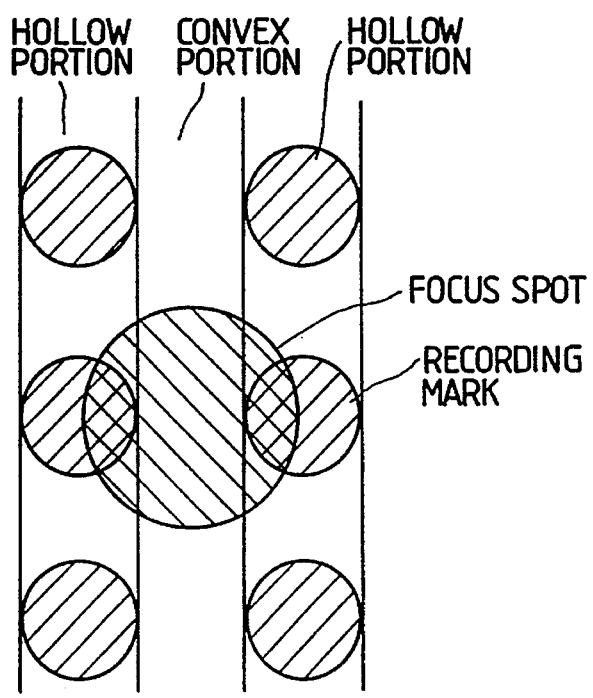
FIG. 22 (a) PRIOR ART
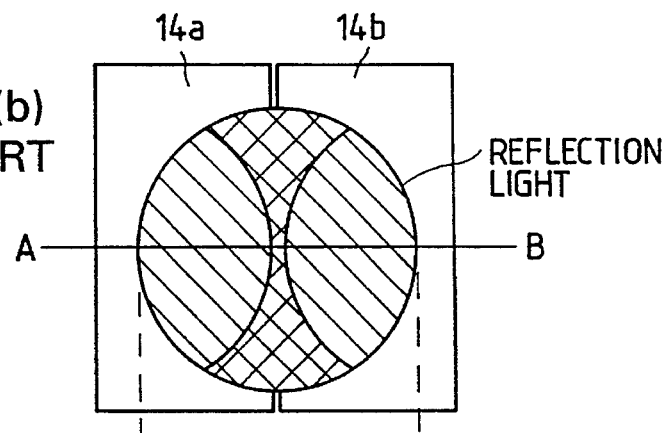
FIG. 22 (b) PRIOR ART
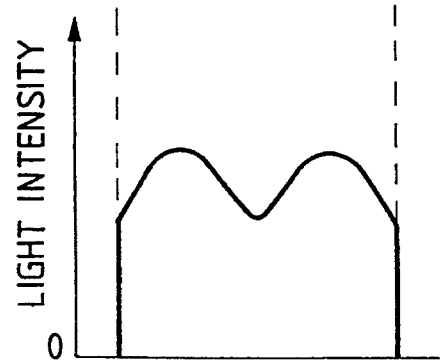
FIG. 22 (c) PRIOR ART

OPTICAL DISC APPARATUS WITH TRACKING ERROR COMPENSATION

TECHNICAL FIELD

This invention relates to an optical disc apparatus and particular to an optical disc apparatus for recording signals on both recording track of hollow and convex portions formed by a guide groove on a disc.

TECHNICAL BACKGROUND

Recently, the development of optical disc apparatus capable of recording and reproducing information signals such as video or voice signal has been active. In the optical disc apparatus capable of recording, a guide groove has previously formed on an optical disc substrate to form tracks. Hereinafter, the track formed by the guide groove is referred to as a hollow portion and the track formed by a portion lies between guide grooves is referred to as a convex portion. Recording or reproduction of the information signal is effected by focusing laser light on a flat portion of the hollow portion or the convex portion of these tracks. In the optical disc, a phase change type material or the like is used, a reflectivity of a recording film thereof changing. In general optical disc apparatus on the market, generally, an information signal is recorded on either of the hollow or convex portion and the other is provided as a guide band for separating adjacent tracks.

FIG. 14 is an enlarged perspective view of an optical disc used in such a prior art optical disc apparatus. In FIG. 14, numeral 1 is a recording layer formed of a phase change material for example. Numeral 2 denotes a recording mark. Numeral 3 is a focused spot of laser light. Numeral 4 is a hollow portion and numeral 5 is a convex portion having a width larger than the hollow portion 4. Numeral 6 denotes an address pit indicative of positional information on the disc. Here, the recording mark is a region whose reflectivity changes by application of laser light having a predetermined intensity. This records the information signal. Moreover, the address pit has been formed as hollow and convex portions of the substrate of the disc previously in the production processing of the optical disc. In FIG. 14, a transparent disc substrate through which incident light transmits is omitted.

A prior art optical disc apparatus using this optical disc will be described with reference to drawings.

FIG. 15 is a block diagram of such a prior art optical disc apparatus. In FIG. 15, numeral 7 is an optical disc and numeral 8 is a recording track which is a convex portion 5 here. Numeral 10 is a semiconductor laser, numeral 11 is a collimation lens for collimating the laser light emitted by the semiconductor laser 10 to output a collimated light, numeral 12 is a half mirror located on a light beam, and numeral 13 is an objective lens for focusing the collimated light transmitted through the half mirror 12 on a recording plane on the optical disc 7. Numeral 14 is a photodetector for receiving a reflection light from the optical disc 7 via the object lens 13 and the half mirror 12 and has two photodetection portions 14a and 14b separated in a direction parallel to the track direction of the disc to obtain a tracking error signal. Numeral 15 is an actuator for supporting the object lens 13. The above-mentioned parts are mounted on a head base not shown and form an optical head 16. Numeral 17 is a differential amplifier supplied with detection signals outputted by the photodetection portions 14a and 14b, and numeral 18 is a lowpass filter (LPF) supplied with a differential signal outputted by the differential amplifier 17. Numeral 19 is a tracking control circuit supplied with an output signal of the LPF 18 for supplying a drive current to the actuator 15. Numeral 20 is a summing amplifier supplied with the detection signals outputted by the photodetection portions 14a and 14b for outputting a summed signal. Numeral 21 is a highpass filter (HPF) supplied with the summed signal from the summing amplifier 20 for supplying a high frequency component to a reproducing signal processing circuit 22 mentioned later, and numeral 22 is the reproduction signal processing circuit supplied with the high frequency component of the summed signal from, the HPF 21 for supplying an information signal such as a voice to an output terminal 23. Numeral 24 is an address reproduction circuit supplied with the high frequency component from the HPF 21 for supplying an address signal to a system controller 31 mentioned later. Numeral 25 is a traverse control circuit for supplying a drive current to a traverse motor 26 mentioned later in accordance with a control signal from the system controller 31 mentioned later. Numeral 26 is a traverse motor for moving the optical head 16 in a radial direction of the optical disc 7. Numeral 27 is a spindle motor for rotating the optical disc. Numeral 28 is a recording signal processing circuit supplied with the information signal such as a voice inputted through an external input terminal 29 for supplying the recording signal to an LD drive circuit 30 mentioned later. Numeral 30 is an LD drive circuit supplied with the recording current from the recording signal processing circuit 28 for inputting the drive current to the semiconductor laser 10. Numeral 31 is a system controller supplied with the address signal from the address reproduction circuit 24 for supplying a control signal to the traverse control circuit 25 and the recording signal processing circuit 28.

An operation of the prior art optical disc apparatus structured as mentioned above will be described with reference to drawing.

A laser beam emitted form the semiconductor laser 10 is converted into a collimated light beam by the collimation lens 11 and focused on the optical disc 7 by the objective lens 13 through the beam splitter 12. The light beam reflected by the optical disc 7 has information on the recording track 8 by diffraction and is introduced on the photodetector 14 by the beam splitter 12 via the object lens 13. The photodetection portions 14a and 14b convert changes in light amount distributions of the incident light beams into electric signals and supply them to the differential amplifier 17 and the summing amplifier 20. The differential amplifier 17 effects I-V conversion of respective input currents and obtains a difference between them to outputs a push-pull signal. The LPF 18 extracts a low frequency component from the push-pull signal to supply it to the tracking control circuit 19 as a tracking error signal. The tracking control circuit 19 flows a drive current through the actuator 15 to effect a position controlling of the object lens 13. This causes the focus spot to scan on the convex portion 5 correctly.

On the other hand, the summing amplifier 20 effects the I-V conversion of output currents of the photodetection portions 14a and 14b and sums them to supply it as the summed signal to the HPF21. The HPF 21 cuts off unnecessary low frequency components from the summed signal and passes the reproduced signal and the address signal as the main information signals to supply them to the reproduction processing circuit 22. The reproduction signal processing circuit 22 demodulates the reproduction signal inputted thereinto and then, effects an error correction processing or the like to supply a voice signal or the like to the output terminal 23. The address reproduction circuit 24 demodulates the address signal inputted thereinto and supplies it as position information on the disc to the system controller 31. That is, as the result of scanning of the focused spot 3 on the recording mark 2, the reproduction signal is inputted into the reproduction signal processing circuit 22. As the result of scanning on the address pit 6, the address signal is inputted to the address reproduction circuit 24. The system controller 31 supplies the control signal in accordance with the address signal to the traverse control circuit 25 to shift the optical head 16 to a desired position.

The traverse circuit 25 supplies a drive current to the traverse motor 26 in accordance with the control signal from the system controller 31 when the optical head is shifted in order to move the optical head 16 to a target track. At this instance, the tracking control circuit 19 temporally intercepts the tracking servo in accordance of the control signal from the system controller 31. Moreover, when the normal reproducing, it drives the traverse motor 26 in accordance with the low frequency component of the tracking error signal inputted from the tracking control circuit 19 to gradually move the optical head in the radial direction as the reproducing advances.

The recording signal processing circuit 28 adds error correction codes or the like to the voice signal or the like inputted from the external input terminal 29 when the recording and supplies it as a coded recording signal to the LD drive circuit 30. The LD drive circuit 30 modulates a drive current applied to the semiconductor laser 10 in accordance with the recording signal. This causes the light spot applied onto the optical disc 7 to have an intensity change in accordance with the recording signal to form recording marks 2.

During the respective operations mentioned above, the spindle motor 27 rotates the optical disc 7 at a constant linear or angular velocity.

Here, an interval between tracks was shortened by narrowing the a width of the hollow portion 4 to increase a recording capacity of the optical disc 7. However, there is a problem that the tracking error signal for controlling the focus spot 3 with a high accuracy decreases because a diffraction angle of the reflection light by the hollow portion 4 becomes Large if the track interval is narrowed. Moreover, there is a limit in narrowing the track interval by only width of the hollow portion 4, so that the width of the convex portion 5 should be narrowed. This will cause a problem of decrease in an amplitude of the reproduction signal because the mark 2 becomes thin.

On the other hand, as described in Japanese patent publication No. 63-57859, there is a technique that a track density is increased by recording information signals on both hollow potion 4 and convex portion 5.

FIG. 16 is an enlarged perspective view of such an optical disc. In FIG. 16, numeral 1 is a recording layer formed with a phase change material for example. Numeral 2 is a recording mark, and numeral 3 is a focus spot of laser light. The same or corresponding parts or element described with re-ference to FIG. 14 are designated as the same references. Numeral 40 is a hollow portion and numeral 41 is a convex portion. As shown in FIG. 16, the hollow portion 40 has approximately the same width as the convex portion 41.

In this optical disc, the recording marks 2 are formed on both hollow potions 40 and convex portions 41. The convex portion 41 has the same period as the convex portion 5 of the optical disc shown in FIG. 14. An interval of mark train is a half of that of the optical disc shown in FIG. 14. Hereinafter, both hollow portion 40 and convex portion 41 are referred to as recording tracks in the meaning that the recording marks 2 are formed. An operation of the recording/reproducing in the optical disc apparatus for this optical disc is carried out in the similar manner to the optical disc apparatus shown in FIG. 15 basically, However, it is necessary to invert a polarity of a tracking error signal between when the focus spot 3 scans on the convex portion 41 and when it scans on the hollow portion 40 as described in the Japanese patent publication No. 63-57859. This can be provided by inserting an inverting amplifier capable of the ON/OFF controlling between the LPF 18 and the tracking control circuit in FIG. 15.

On the other hand, there is a problem that in the technique disclosed in the Japanese patent publication No. 63-57859, it is impossible to effect the tracking of the focus spot on a target recording track with a high accuracy if either of recording tracks lie on the both side of the target recording track has been recorded and the other has not recorded. FIG. 17 is an enlarged perspective view of an optical disc in such a case. It shows that the recording marks 2 have been recorded on the recording track on the left side off the recording track on which the focus spot 3 scans but on the right side of the recording track there is nothing recorded. In the above-mentioned technique, since a recording track pitch is substantially half of a diameter of the focus spot, the focus spot overlaps the recording tracks adjacent to the recording track which is desired to be scanned. Therefore, the reflected light is effected by the mark train on the recording track adjacent thereto. The case as shown in FIG. 17 occurs if an optical disc on which nothing has been recorded over a whole surface is successively recorded from the inside circumference side. In this case, the recording track on an inner circumference side of the recording track under scanning has been recorded already and on the recording track outside of the recording track under scanning has not been recorded. Here, the reason why the accuracy of the tracking decreases is described in detail hereinbelow.

FIG. 18 shows an enlarged view (a) of a disc surface, an illustration (b) for showing brightness/darkness of the reflection light reaching the photodetector 14, and a cross-sectional view (c) of intensity distribution of the reflection light reaching the photodetector 14 in the case that the recording tracks on the both sides of the recording track on which the focus spot scans. However, these drawings show the light amount distribution of the reflection light approximately and is not accurate. Moreover, for convenience for explaining, they show the case that there is no recording marks on the center convex portion. As shown in FIG. 18(a), in the case that the focus spot scans at just center of the target recording track and the recording has not been effected on the recording tracks on the both sides thereof, the light amount distribution of the reflection light reaching the photodetector 14 is symmetric in the direction corresponding to the track direction as shown in FIG. 18(b) by the diffraction effect due to a difference in level between the hollow and convex portions. The light amount distribution in the cross section taken on the line A-B is shown in FIG. 18(c). The amounts of light received by the two photodetection portions 14a and 14b in the photodetector 14are equal each other. Therefore, a difference between levels of the detection signals outputted by the two photodetection portions 14a and 14b through photoelectric conversion, that is, a DC level of the tracking error signal is zero.

FIG. 19 shows an enlarged view (a) of a disc surface, an illustration for showing brightness/darkness of the reflection light reaching the photodetector 14, and a cross-sectional view (c) of the intensity distribution of the reflection light reaching the photodetector 14 in the case that the recording has carried out on either of recording tracks adjacent to the recording track on which the focus spot scans. As shown (a) in FIG. 19, if the focus spot scans just the center of the target recording track and a portion of the focus spot overlaps a recording mark on the recording track on the inner circumference side, the light amount distribution of the reflection light reaching the photodetector 14 is asymmetric between right and left side as shown by (b) in FIG. 19 due to effect of the recording mark. The light amount distribution on the cross section taken on the line AB shown by (b) in FIG. 19 is as shown by (c) in FIG. 19. That is, the amounts of light received by the two photodetection portions 14a and 14b of the photodetector 14 are not equal each other. Therefore, the DC level of the tracking error signal is not zero (hereinafter the DC level in this case is assumed as Voff). That is, an offset of Voff occurs in the tracking error signal. Actually, a positional relation between the focus spot and the recording mark is such that the focus spot may not almost overlap any of the recording marks in the case that the focus spot locates between recording marks on the adjacent track as shown in FIG. 20. In this case, the DC offset in the tracking error signal obtained by the reflection light does not occur almost. Accordingly, a signal component of the data signal is mixed with the tracking error signal in accordance with the positional relation between the recording marks on the adjacent recording track and the focus spot. FIG. 21 shows a waveform of the tracking error signal with which the information signal is mixed. A component of the band of the information signal is removed from the tracking error signal by the LPF 18 as shown in FIG. 15, so that that tracking error signal has a value averaged between Voff and zero, that is, it has a DC offset. It is clear that if an optical system of the optical head 16 has no aberration and a cross section shape of the guide groove of the optical disc is symmetric with respect to the center of the groove, the DC offset has an equal absolute value and opposite polarities between the case that the recording mark exists on the hollow portion on the right and the case the recording mark exists on the hollow portion on the left as shown in FIG. 10.

Moreover, FIG. 22 shows an enlarged view (a) of a disc surface, an illustration for showing brightness/darkness of the reflection light reaching the photodetector 14, and a cross-sectional view (c) of the intensity distribution of the reflection light reaching the photodetector 14 in the case that the recording has been carried out on both recording tracks adjacent to the recording track on which the focus spot is scanning. As shown (a) in FIG. 22, if the focus spot scans just the center of the target recording track and a portion of the focus spot overlaps any of the recording marks on the adjacent recording tracks on the both sides, the light amount distribution of the reflection light reaching the photodetector 14 is symmetric between right and left sides with respect to the track direction as shown by (b) in FIG. 22 due to effect of the recording mark on both sides. The light amount distribution on the cross section taken on the line AB shown by(b) in FIG. 22 is as shown by (c) in FIG. 22. That is, the amounts of light received by the two photodetection portions 14a and 14b on the photodetector 14 are equal each other. Therefore, the DC level of the tracking error signal is zero. However, a DC level occurs in the tracking error signal in accordance with relative positional relation between the recording marks on the recording track on the both sides in the case also. However, since the DC levels have both positive and negative polarities, it can be easily predicted that the DC levels become zero by averaging by the LPF 18.

As mentioned above in detail, there is a problem that the offset occurs in the tracking error signal if the recording marks exist only on the either of the recording tracks adjacent to the target recording track to be scanned by the focus spot, so that the tracking controlling becomes inaccurate.

DISCLOSURE OF THE INVENTION

This invention aims to provide an optical disc apparatus having a high accuracy in the tracking control if an information signal is recorded on the both hollow and convex portions on an optical disc. Thus, an optical disc apparatus of this invention comprising: an optical disc, having recording tracks including hollow and convex portions formed by a guide groove on the optical disc, for recording an information signal using change in a local optical constant or physical shape by the application of a light beam; an optical system for applying the light beam generated by a light source onto the optical disc; first moving means for moving the light beam applied to the optical disc in the vertical direction to the track direction; second moving means for relatively moving the light beam applied to the optical disc in the track direction; tracking error detection means for detecting an amount of deviation between the light beam applied to the optical disc and the recording track in a direction vertical to the track direction to output an error signal from the light beam reflected at or transmitted through the optical disc; tracking controlling means for controlling the first moving means such that the light beam applied on the optical disc scans on the recording track; judging means for judging whether or not either of two recording regions adjacent in the direction vertical to the track direction with respect to a position where the light beam applied on the optical disc is scanning; compensation means for compensating a DC offset in the error signal outputted by the tracking error detection means in accordance with the output of the judging means. According to the structure described above, the judging means detects that the recording has been carried out only on either recording region of two recording regions adjacent in the vertical direction to the track direction with respect to a position of a light beam applied onto the optical disc while the optical system applies the light beam on the recording track. The error signal outputted by the tracking error detection means is compensated by the compensation means in accordance with the output of the judging means. The tracking controlling means positions the light beam on the recording track correctly through the first moving means.

Moreover, the judging means mentioned above has least comprises: address detection means for detecting a present address where the light beam applied to the optical disc is scanning; storing means for storing addresses of regions of the optical disc where the recording has been carried out; judging means for judging whether the signal has been recorded on either of two recording tracks adjacent to the recording track on which the light beam is presently scanning from the present address detected by the address detection means and the addresses of recorded regions stored in the storing means. This structure provides discrimination whether or not the signal has been recorded only on either of two adjacent recording regions from the addresses of recorded regions stored in the storing means and the present address detected by the address detection means.

Further, the tracking error detection means mentioned above comprises photodetection means for receiving the light beam reflected or transmitted from the optical disc and for outputting at least two detection signals which are approximately proportional to amounts of received light and a differential amplifier for outputting a difference signal between at least two detection signals. The compensation means adds an amount of offset in accordance with the output of the judging means to the difference signal outputted by the tracking error detection means. According to this structure, the photodetection means receives the light beams reflected at or transmitted through tile optical disc and outputs at least two detection signals approximately proportional to the amount of received light. The differential amplifier outputs a difference signal of these at least two detection signals as the tracking error signal. The compensation means eliminates the offset in the tracking error signal by applying an offset amount having an inverted polarity to the tracking error signal such that the asymmetry in the reflected light ocurring due to the recording marks on the adjacent recording track is cancelled.

Moreover, the tracking error detection means comprises photodetection means for receiving the light beam reflected or transmitted from the optical disc and for outputting at least two detection signals which are approximately proportional to amounts of received light and a differential amplifier for outputting a difference signal between these at least two detection signals. The compensation means, provided between the above-mentioned photodetection means and the differential amplifier, amplifies or attenuates inputted detection signals and supplies the result to the differential amplifier which has at least two variable amplification gains changed in accordance with output of the judging means, which is preferable also. According to this structure, the photodetection means receives the light beam reflected or transmitted through the optical disc and outputs at least two detection signals approximately proportional to the amount of received light to the compensation means. The variable gain amplifier amplifies or attenuates these detection signals at respective different amplification gains such that the asymmetric in the reflection light occurring due to the recording marks on the adjacent recording track is cancelled and output the result to the differential amplifier. The differential amplifier outputs a difference signal between these signals as the tracking error signal wherein the offset is removed. This provides a superior advantage effect that the offset compensation function is not dependent on the change in the reflectivity of the optical disc.

Moreover, in addition to the above-mentioned structure, in an optical disc apparatus of this invention, the storing means further comprises the a control region provided at a specific regions on the optical disc for recording addresses of the recorded regions. Thus, when the information signal is recorded, the addresses of the regions where the recording has carried out is stored. Then this provides a easy discrimination whether or not the signal has been recorded only on either of two adjacent recording regions by the judging means by reading out the address of the recorded regions from the control regions when the recording or reproduction is carried out at the next time.

At last, an optical disc apparatus of this invention has recording controlling means for continuously recording the information signal from the beginning of the recording track. According to this structure, the judging means compares the present address detected by the address detection means with the recorded address stored in the storing means to detect whether or not the recorded region finishes before one rotation from the present address. The recording control means records the information signal continuously from the beginning of the recording track, so that it can be judged that the recording has been carried out on both adjacent recording regions when the the recorded region will not finish before one rotation of the recording track from the present address. If the recorded region has finished, it can be judged that the information signal has been recorded only on the adjacent recording region before starting of recording. As mentioned above, the discrimination of the recorded region becomes more easier.

BRIEF DESCRIPTION OF THE DRAWINGS

FIG. 5 is a drawing for showing a logical correspondence table between input terminals and output terminals of an analog multiplexer 233 in the same embodiment, FIGS. 18 to 22 are illustrations, respectively showing focus spots of the prior art optical disc apparatus.

PREFERRED EMBODIMENT OF THE INVENTION

Hereinbelow an optical disc apparatus in an embodiment of tile invention, This embodiment will be described in the case where a phase change (Phase Change) type of recording material is used for the optical disc capable of recording and reproduction, the reflectivity thereof changes because a recording film shows a conditional change between amolphouse and crystal by heating by a light beam application. Moreover, the embodiment will be described in the case where the rotation control of the optical disc is the constant angler velocity (CAV: abbreviation of Constant Angular Velocity) is used.

Figure 1:
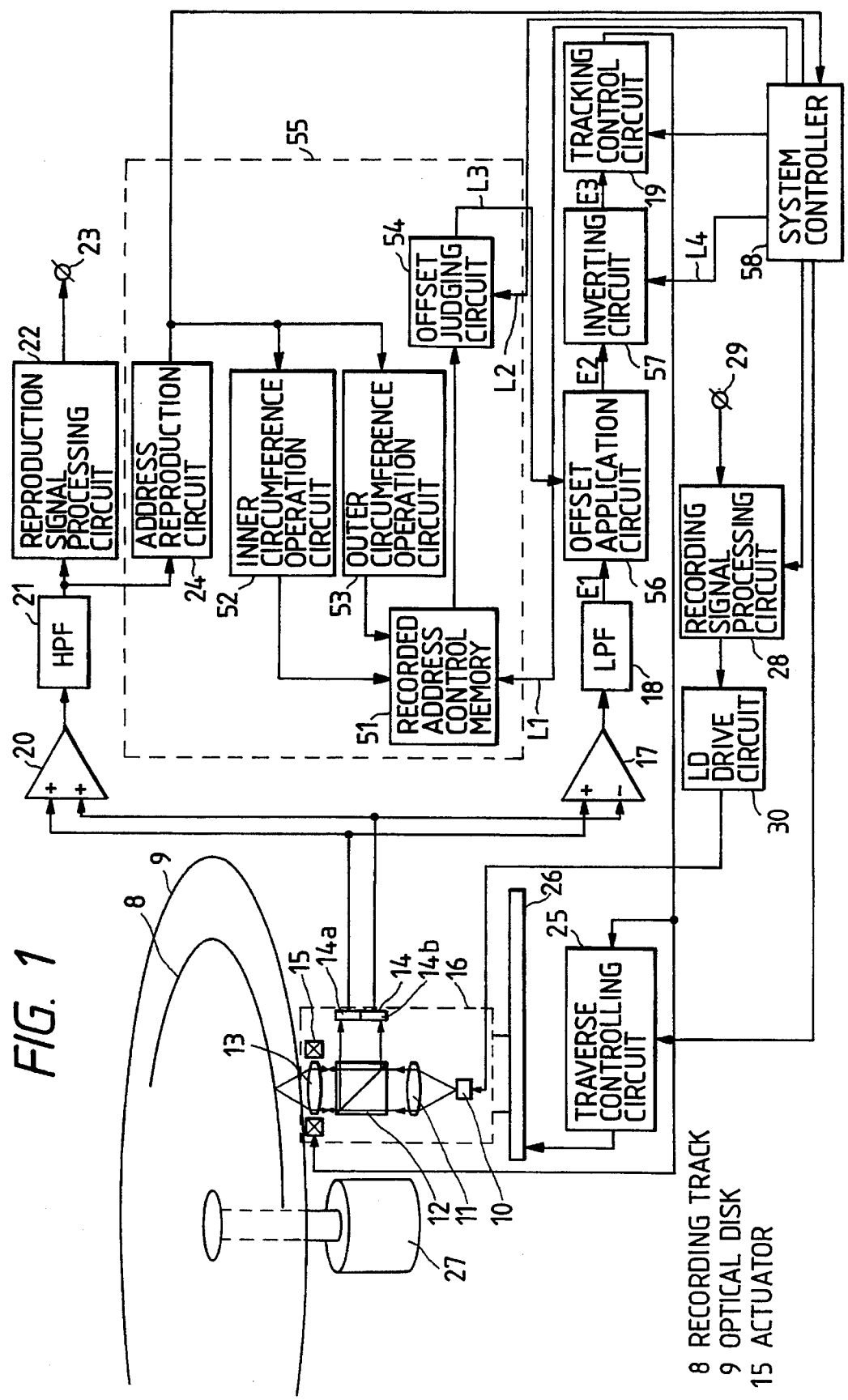
FIG. 1 is a block diagram of a first embodiment concerning to an optical disc apparatus of this invention.

FIG. 1 is a block diagram of an optical disc apparatus of the first embodiment of the invention. In FIG. 1, numeral 9 is an optical disc having recording tracks on both hollow and convex portions and numeral 8 is a recording track. Numeral 10 is a semiconductor laser, numeral 11 is a collimation lens, numeral 12 is a half mirror, numeral 13 is an object lens, numeral 14 is a photodetector, numeral 14a and 14b are photodetection portions thereof, numeral 15 is an actuator, numeral 16 is an optical head, numeral 17 is a differential amplifier, numeral 18 is a low pass filter (LPF), numeral 19 is a tracking control circuit, numeral 20 is a summing amplifier, numeral 21 is a high pass filter (HPF), numeral 22 is a reproduction signal processing circuit, numeral 23 is an output terminal, numeral 24 is an address reproduction circuit, numeral 25 is a traverse controlling circuit, numeral 26 is a traverse motor, numeral 27 is a spindle motor, numeral 28 is a recording signal processing circuit, numeral 29 is an external input terminal, and numeral 30 is an LD drive circuit. Because the above-mentioned elements are essentially the same as the structural elements of the prior art optical disc apparatus shown in FIG. 15, the same elements are designated by the same reference and the detailed description is omitted.

Figure 15:
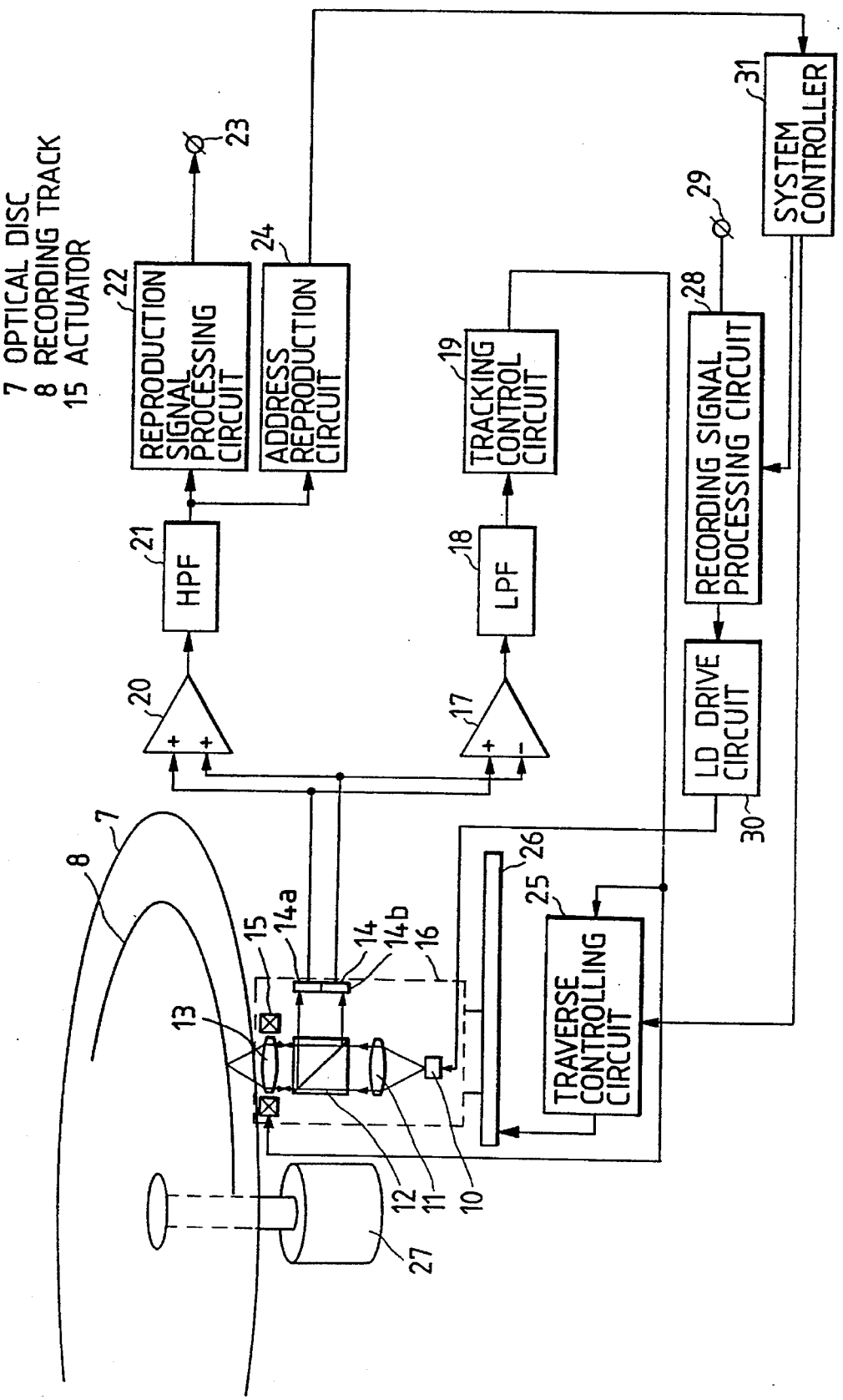
FIG. 15 is a block diagram showing structure of the prior art optical disc apparatus.
Figure 16:
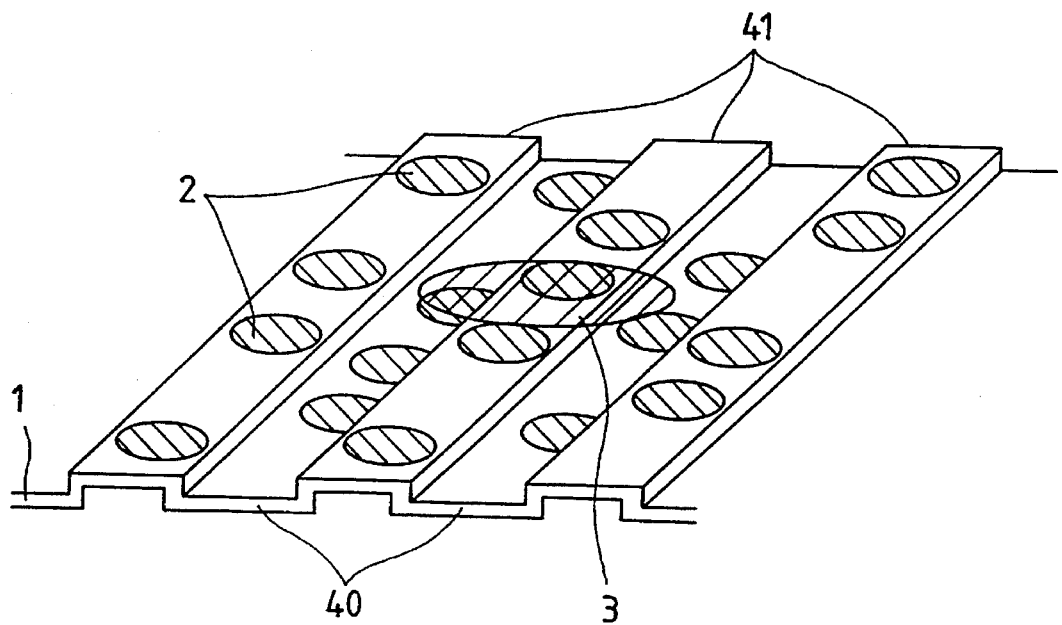
FIG. 16 is an enlarged perspective view for explaining structure of the prior art optical disc where a signal is recorded on both hollow and convex portions of recording tracks.
Figure 17:
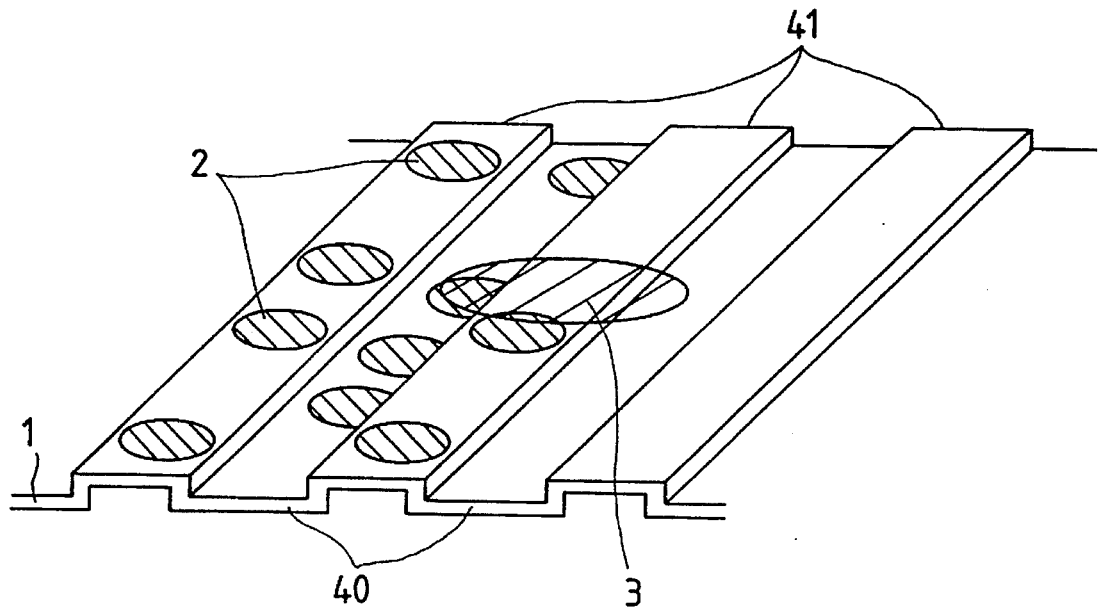
FIG. 17 is an enlarged perspective view showing the case that the recording has been effected on either of recording tracks adjacent to the target recording track and the other recording track has not been recorded in the prior art optical disc on which the signal is recorded on both hollow and convex portions of the recording tracks.

Structure different from FIG. 15 will be described. Numeral 51 is an recorded address control memory supplied with an address signal and flag information data and an R/W control signal L1 from a system controller 58, mentioned later on the description of recording, for supplying a flag information data to an offset judging circuit 54 mentioned later. Contents of the L1 will be described. The address signal is indicative of an address value of a sector on the optical disc. The flag information data is a binary information of one bit and becomes Hi level when the information signal is recorded. The R/W control signal is a binary information of one bit and determines whether the flag information data is written on the recorded address control memory 51 or the flag information data is read out from the recorded address control memory 51. Here, it is assumed that the flag information data is written into the recorded address control memory 51 when the R/W control signal is Hi level and it is read out when Lo level. The recorded address control memory 51 is formed with memory cells collected, an address of each of memory cells (hereinafter this is referred to as an address in the memory) corresponds to each sector of the optical disc 9 at a ratio 1:1. Each of memory cells stores binary data of one bit and acts as a flag indicating that the corresponding sector has been recorded. Here, it is assumed that if a value obtained by reading a memory cell is Hi, at the sector whose address corresponds to the memory cell, the information signal has been recorded and if it is Lo, the information signal has not been recorded. Numeral 52 is an inner circumference address operation circuit supplied with the present address from the address reproduction circuit 24 for supplying a first address signal to the recorded address control memory 51, numeral 53 is an outer circumference address operation circuit supplied with the present address from the address reproduction circuit 24 for supplying a second address signal to the recorded address control memory 51. Numeral 54 is an offset judging circuit supplied with the flag information data from the recorded address control memory 51 and a control signal L2 from the system controller 58 for supplying a control signal L3 to an offset application circuit 56 mentioned later. Numerals 51, 52, 53, and 54 mentioned above form an offset judging means 55. Numeral 56 is the offset application circuit supplied with an error sign E1 form the LFP 18 and the control signal L3 from the offset judging circuit 54 for supplying an error signal E2 to an inverting circuit 57 mentioned later. Numeral 57 is the inverting circuit supplied with the error signal E2 from the offset application circuit 56 and a control signal L4 from the system controller 58 for supplying the error signal E3 to the tracking control circuit 19. Numeral 58 is the system controller comprising a microcomputer or the like.

Figure 2A:
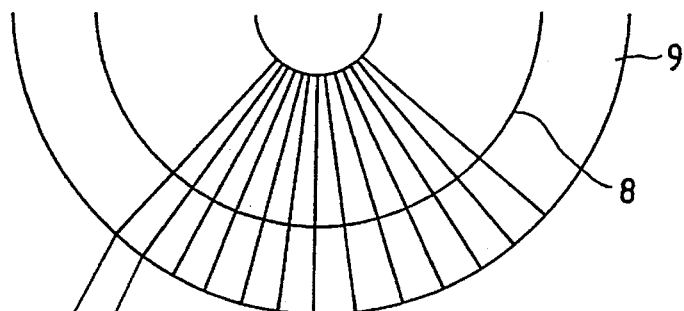
FIG. 2 is an illustration for showing structure of a recording format of the optical disc of the same embodiment.
Figure 2B:
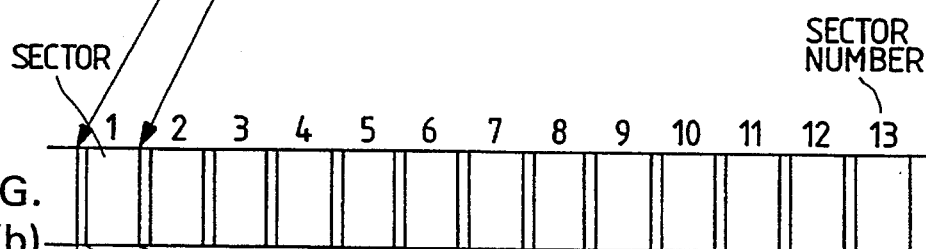
Figure 2C:
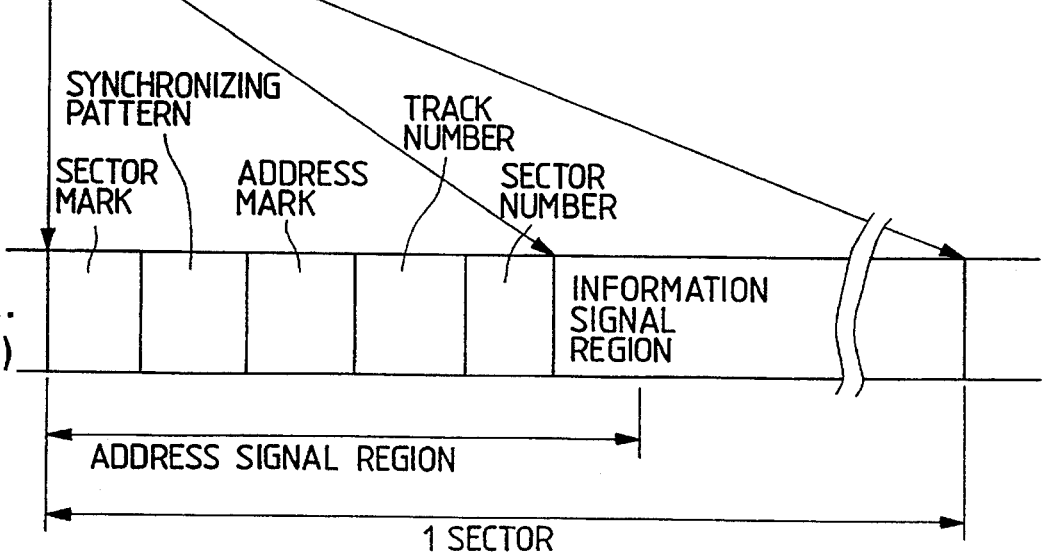

Here, the recording format of the optical disc of this embodiment will be described. FIG. 2 shows illustrations for showing structure of the recording format of the optical disc of this embodiment, wherein (a) in the same drawing is a plan view of the optical disc, (b) in the same drawing shows structure of one recording track, and (c) in the same drawing shows structure of one sector. Numeral 9 is the optical disc of this embodiment and numeral 8 is the recording track of the optical disc. As shown in (a) and (b) in the same drawing, one track is divided into a plurality of sectors. Each of sectors can be radially arranged in the radial direction of the disc because of using CAV. As shown in (c) in the same drawing, one sector is formed of address signal and information signal regions. The address signal region comprises blocks of a sector mark, a synchronizing pattern, an address mark, a track number, and a sector number which has been previously recorded with hollow and convex portions or the like formed on the substrate of the disc. Functions of respective blocks are as follows:

1) sector mark: indicating a top of each sector.

2) synchronizing pattern: generating a clock for reproducing address data.

3) address mark: indicating the beginning of address data.

4) track number, sector number: indicating address data.

The sector mark, the synchronizing pattern, and the address mark are common to all sectors. Moreover, sectors adjacent each other in the radial direction have the same sector number.

An operation of the optical disc apparatus of this embodiment having the structure mentioned above will be described with reference to FIG. 1. Recording and reproduction operations of the optical disc apparatus of this embodiment are basically the same as the prior art optical disc apparatus shown in FIG. 15. Thus, detailed descriptions of the recording and reproduction operations are omitted. Here, it is described how stabilization in the tracking control is carried out.

At first, tile operation during recording will be described. As the optical head 16 records the information signal at each sector of the optical disc 9, in parallel to this, the system controller 58 sends addresses of the sector (the track address and the sector address), the flag information data of Hi level, and the R/W control signal L1 of Hi level to the recorded address control memory 51. While the information signal is recorded, binary values in the memory cells indicated by the address signal supplied from the system controller 58 are successively recorded to have Hi levels. In the recorded address control memory 51, this provides a map of the flag information indicative of addresses indicating sectors where the recording has been carried out on the optical disc 9.

Then, when the recording or reproducing of the information signal is carried out, the inner circumference address operation circuit 52 calculates an address of a recording region adjacent to a recording region on the recording track on inner circumference side on the basis of the present address outputted from the address reproduction circuit 24 and supplies the result as the first address signal to the recorded address control memory 51. In this embodiment, because sectors adjacent to each other in the radial direction has the same sector number because of the CAV controlling, the first address can be obtained only by subtracting one from the track number of the present address. The system controller 58 supplies the R/W control signal having Lo level through the L1 to the recorded address control memory 51 at the same timing as the first address signal is inputted. The recorded address control memory 51 supplies the flag information of the memory cell indicated by the first address signal as the first flag information data to the offset judging circuit 54. Then, the outer circumference address operation circuit 53 calculates an address of an adjacent recording region on the recording track on the outer circumference side on the basis of the present address outputted from the address reproduction circuit 24 and supplies the result as the second address signal to the recorded address control memory 51. The system controller 58 outputs the R/W control signal having a Lo level through the L1 to the recorded address control memory 51 at the same timing as the second address signal is inputted. The recorded address control memory 51 supplies the flag information of the memory cell indicated by the second address signal ad the second flag information data to the offset judging circuit 54. The offset judging circuit 54 catches the first flag information data and the second flag information data in internal latch in phase with the control signal L2 from the system controller 58, then compares them, and supplies a voltage of −V1 to the offset application circuit 56 through the L3 to the offset application circuit 56 when only first flag information data is Hi, a voltage of −V2 through the L3 to the offset application circuit 56 when only second flag information is Hi, and a voltage of zero through the L3 to the offset application circuit 56 when both are the same. The offset application circuit 56 applies a voltage inputted through the L3 as an offset voltage to the error signal E1 and supplies the result as the error signal E2 to the inverting circuit 57.

Here, the V1 and V2 are previously set to be equal to offset voltages of the tracking error signal when the recording marks exist only on the adjacent recording track on the inner circumference side or the outer circumference side. This provides that the error signal E2 cancels the offset due to existence of the recording marks only on the adjacent recording track on the inner circumference side or the outer circumference side.

The V1 and V2 can be previously obtained through the following steps for example.

Step 1: the information signal is recorded on only one track on the optical disc.

Step 2: the information signal is recorded on the recording track on the just inner circumference side with application of a DC offset having a suitable level to the tracking error signal.

Step 3: the recorded surface is observed with an electronic microscope to measure a track deviation amount between the recording mark and the track.

Step 4: steps 2 and 3 are repeated at several times with changing the amount of the DC offset.

Step 5: the −V1 is determined by the DC offset value providing the least track deviation amount in the step 3.

Step 6: steps 2 to 5 are repeated. However, in this time, the information signal is recorded on the recording track on the just outer circumference side to determine the −V2.

In accordance with the control signal L4 from the system controller 58, the inverting circuit 57 effects inversion/noninversion of the error signal E2 from which the offset is removed and supplies the result to the tracking control circuit 19. As mentioned earlier, the polarity of the obtained error signal E1 is inverted between when the light beam scans the hollow portion and the convex portion. Therefore, the system controller 58 detects whether the hollow portion or the convex portion from the present address and determines the polarity of the tracking error signal by the inverting circuit 57 so as to effect the tracking control. As a method of detecting from the address whether hollow portion or the convex portion is, for example, it is sufficient that a rule has been previously determined such that in the case of the hollow portion, the track number is an odd number and in the case of the convex portion, the track number is even.

Figure 3:
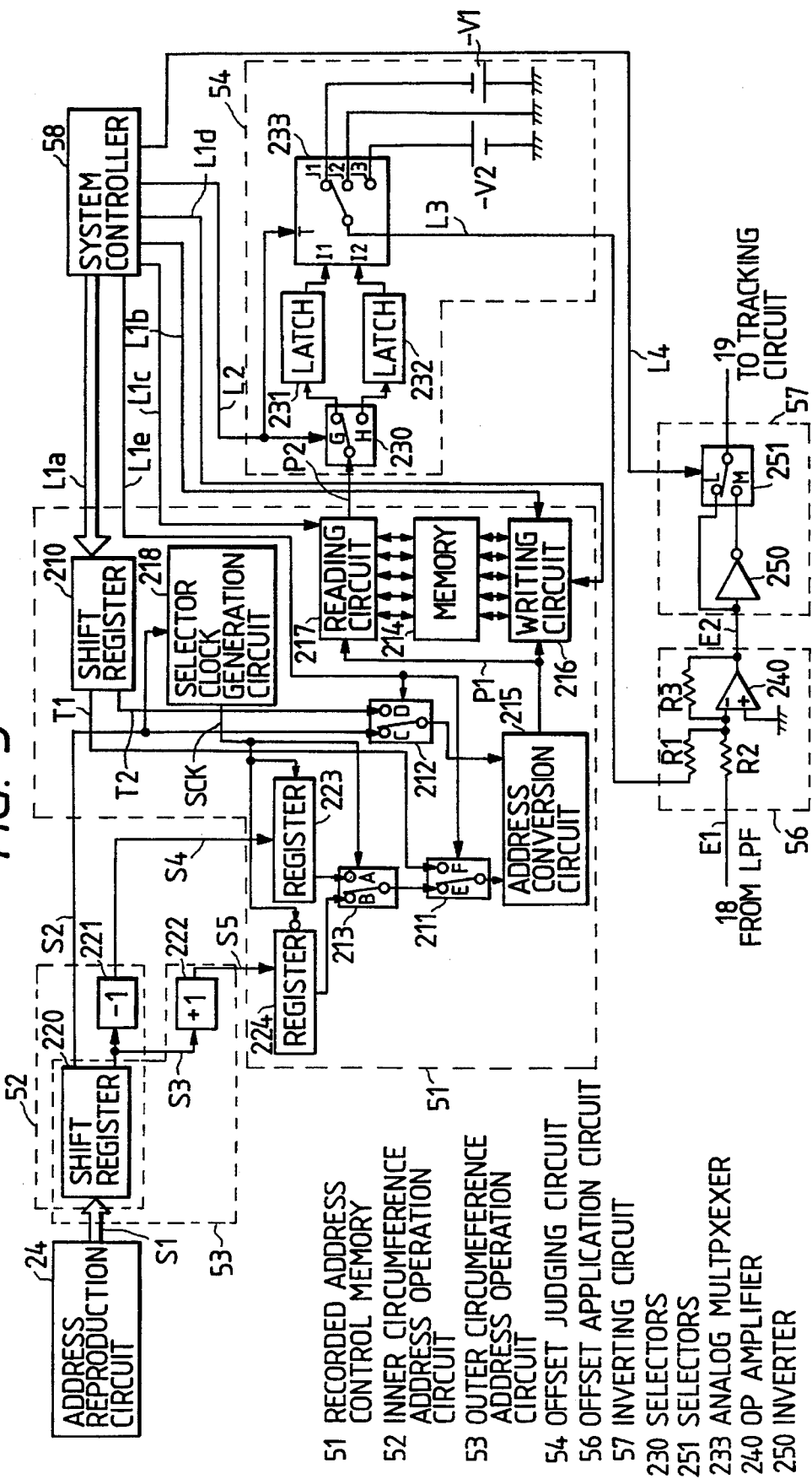
FIG. 3 is a block diagram for showing details of main portions of the same embodiment.

FIG. 3 is a detailed block diagram of the recorded address control memory 51, the inner circumference address operation circuit 52, the outer circumference address operation circuit 53, the offset judging circuit 54, the offset application circuit 56, and the inverting circuit 57. Hereinbelow operations of these circuits will be described in detail.

At first, will be described the case where the information signal is recorded. The signal L1 inputted from the system controller 58 to the recorded address control memory 51 includes an address signal L1*a*, a flag information data L1*b*, a reading out control signal L1*c*, a writing control signal L1*d*, and a recording reproducing switching signal L1*e*. The L1*a* is binary data having several bits indicative of the track number and the sector number, L1*b* is binary data of one bit which is Hi level while the information signal is recorded, the L1*c* is a binary signal of one bit which is Hi level when data is written in the recorded address control memory, the L1*d* is a binary signal of one bit which is Hi level when data is read out from the recorded address control memory, and the L1*e* is a binary signal of one bit which is Hi while the information signal is recorded on the optical disc and is Lo level during the reproducing.

The system controller 58 inputs an address of a sector where the information signal is being recorded presently as the address signal L1*a* to a shift register 210. The shift register 210 divides the address into the track number and the sector number and inputs them through the T1 and T2 to an input terminal F of the selector 211 and to an input terminal D of the selector 212. The selector 211 supplied with the L1*e* and connects an output terminal to the input terminal F when the L1*e* is Hi level. The selector 212 supplied with the L1*e* also connects an output terminal to the input terminal D when the L1*e* is Hi level. Therefore, the address conversion circuit 215 is supplied with the address of the sector which is being presently recorded from the shift register 210. The address conversion circuit 215 converts it to an inside address P1 corresponding to the inputted address and supplies it a writing circuit 216. The writing circuit 216 functions writing binary data into each memory cell in the memory 214. Each memory cell in the memory 214 corresponds an address of each sectors of the optical disc 9 with a ratio 1:1. Each memory cell stores one bit of binary data which acts as a flag indicating that the recording has been effected at the corresponding sector. Here, it is defined that if the value read out from a memory cell is Hi, the information signal has been recorded at the sector having an address corresponding to the memory cell, and if the value is Lo, the information signal has not been recorded. The writing circuit 216 is supplied with the writing control signal L1*d* also and writes the flag information data L1*b* (here, Hi level) into the memory cell indicated by the inside address 1 when the L1*d* is Hi level. As mentioned above, in the recorded address control memory 51, during the recording of the information signal, binary values in the memory cells indicated by the address signal L1*a* inputted form the system controller 58 become Hi level successively. This forms the map of flag information indicating addresses of sectors where the recording has been carried out on the optical disc 9 in the recorded address control memory 51.

Then, the case of the reproducing the information signal will be described. The address reproduction circuit 24 reads out the present address signal from the signal reproduced from the optical disc 9 and supplies it as S1 to a shift register 220. The shift register 220 divides the S1 into the track number and the sector number and supplies the sector number as S2 to an input terminal C of the the selector 212 and to the sector clock generation circuit 218 and the track number as S3 to a decrement circuit 221 and to an increment circuit 222. The selector 212 connects the input terminal C to an output terminal when L1*e* is Lo level. Therefore, the sector number S2 is inputted to the address conversion circuit 215. The sector clock generation circuit 218 generates from S2 a sector clock SCK which is in phase with carry of the sector number and supplies it to a register 223, a register 224, and to a selector 213. On the other hand, the decrement circuit 221 subtracts one from the inputted track number S3 and supplies the result as an inner circumference track number S4 to the register 223. The increment circuit 222 adds one to the inputted track number S3 and supplies the result as an outer circumference track number S5 to the register 224. The SCK is a clock signal having a duty ratio of 50% and a period which is the same as the period of the sector address, with its rising edge in phase with a carry timing of the sector address.

Figure 4:
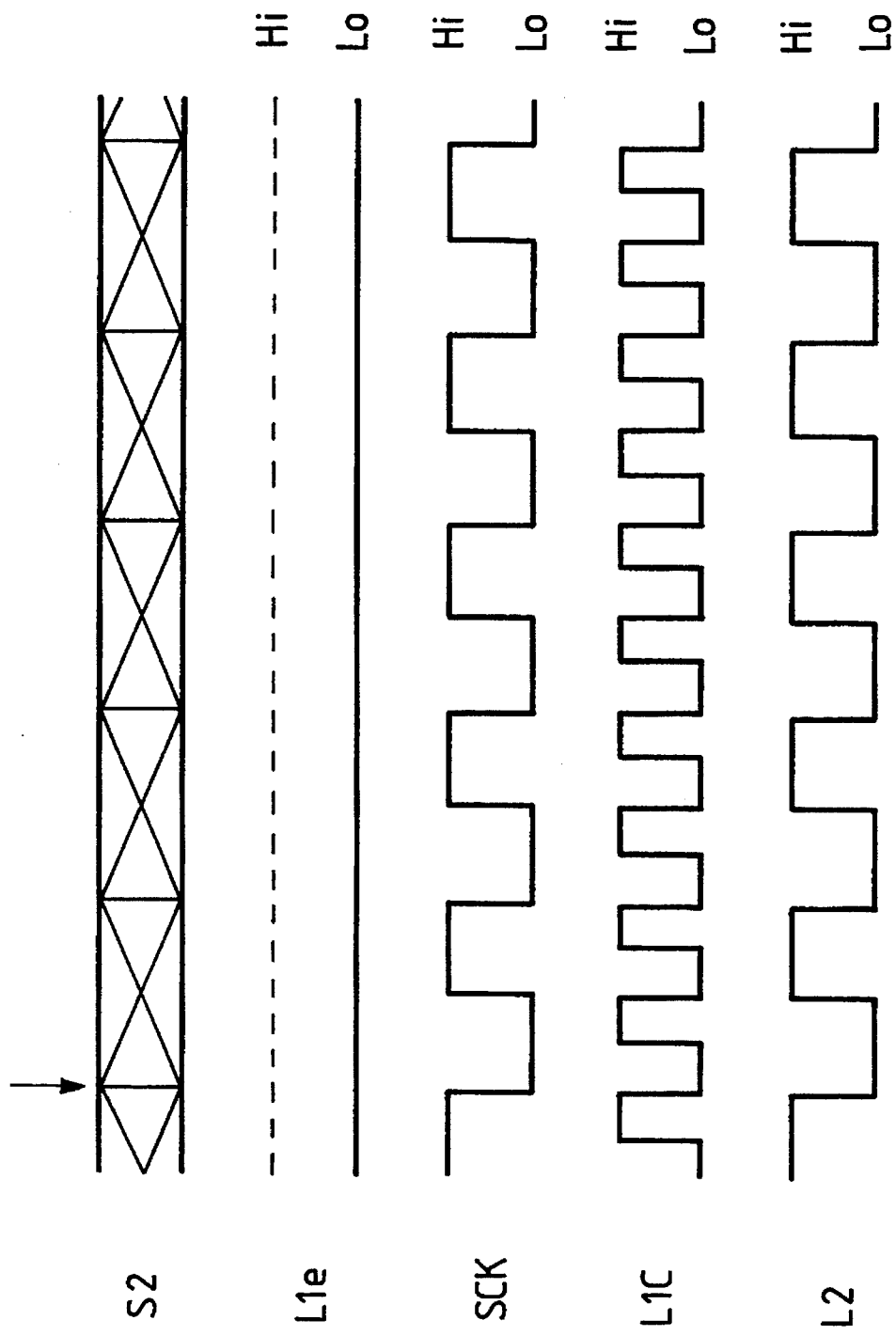
FIG. 4 is a timing chart of respective control signals at the main portion of the same embodiment.

The register 223 supplies the inner circumference track number S4 to an input terminal A at a timing of rising of SCK. The selector 213 connects the input terminal A to the output terminal during Hi level of the SCK and supplies the S4 to an input terminal of the selector 211. The selector 211 connects the input terminal E to the output terminal when L1*e* is Lo level, so that the S4 is inputted to the address conversion circuit 215. The address conversion circuit 215 converts S4 into an inside address P1 and supplies the result to the reading circuit 217. The reading circuit 217 reads a flag information P2 from the memory cell indicted by the inside address P1 when the reading control signal L1*c* is Hi and supplies it to an input of the selector 230. The selector 230 connects an input terminal to an output terminal G when the switching signal L2 is Lo, and connects the input terminal to the output terminal H when L2 is Hi. Here, a phase is adjusted such that L2 becomes Lo at the timing that the flag information data (corresponding to the first flag information data mentioned earlier) corresponding to the inside track address S4. Therefore, the first flag information data is inputted to a latch 231 through the selector 230. An output of the latch 231 is connected to an input terminal I1 of an analog multiplexer 233, so that the first flag information data is inputted to I1. On the other hand, the register 224 inputs the outer circumference track number S5 to the input terminal B of the selector 213 at a timing of a falling of the SCK. The selector 213 connects the input terminal B to the output terminal during Hi level of the SCK and inputs the S5 to the input terminal E of the selector 211. The selector 211 connects the input terminal E to the output terminal when L1*e* is Lo level, so that the S5 is inputted to the address conversion circuit 215. The address conversion circuit 215 converts the S5 into the inside address P1 and supplies the result to the reading circuit 217. The reading circuit 217 reads a flag information P2 from the memory cell indicted by the inside address P1 when the reading control signal L1*c* is Hi and supplies it as the second flag information data to the selector 230. At this instance, the L2 becomes Hi, so that the input terminal is connected to the output terminal H and the second flag information data is inputted to the latch 232 through the selector 230. The output of the latch 232 is connected to an input terminal I2 of the analog multiplexer 233, so that the second flag information data is inputted to the I2. FIG. 4 is a timing chart showing the sector number S2, the sector clock SCK, the reading control signal L1*c*, the recording reproducing control signal L1*e*, and the switching signal L2.

Figure 5:
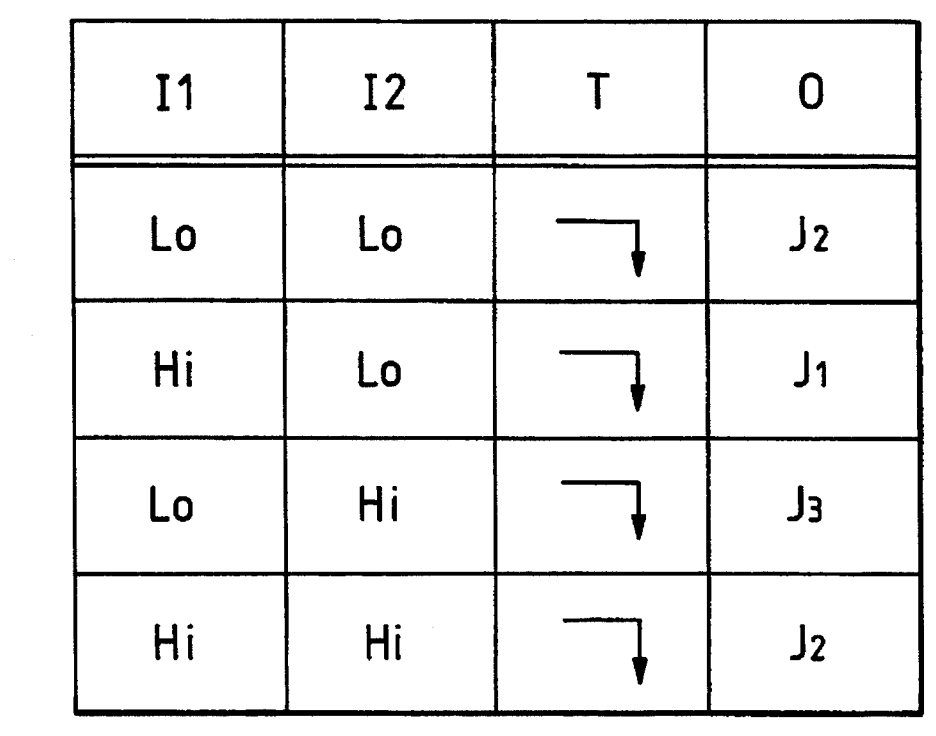

The analog multiplexer 223 is supplied with the switching signal L2 to an input terminal T and connects an output terminal 0 to either of three input terminals J1, J2, or J3 in accordance with values of the three control input terminals I1, I2, and T. The J1 is connected to a voltage source for generating a voltage of −V1 mentioned earlier, J3 is connected to a voltage source for generating a voltage of −V2 mentioned earlier, and the J2 is grounded. A table showing correspondence between the I1, I2, and T terminals connected to the output terminal 0 is shown in FIG. 5. As shown in FIG. 5, when only first flag information data inputted I1 is Hi level, the voltage of −V1 is generated at the output terminal 0, when only second flag information data inputted to I2 is Hi level, the voltage of −V2 is generated at the output terminal 0, and when both are the same, a zero voltage is generated at the output terminal 0. The explanation will be continued with reference to FIG. 3. The voltage generated at the output terminal 0 is inputted to an input side resistor R1 of the offset application circuit 56 as the control signal L3. As shown in the drawing, the offset application circuit 56 comprises an summing circuit having an 0P amplifier 240, and resistors R1, R2, and R3 which have the same resistance. The other input side resistor R2 is connected to an output terminal of an LPF 18 not shown, so that it is supplied with the tracking error signal E1. Therefore, at an output terminal of the 0P amplifier 240, a second tracking error signal E1 is generated which is obtained by summing the tracking error signal E1 and the control signal L3 (−V1, −V1 or zero voltage). The inverting circuit 57 comprises an inverter 250 and a selector 251. One input terminal L of the selector 251 is connected to an input terminal of the inverter 250 and the other input terminal M is connected to an output of the inverter 250. An output terminal of the selector 251 is connected to an input terminal of a tracking control circuit 19 not shown. The selector 251 is supplied with a control signal L4 from the system controller 58, connects the input terminal L to the output terminal when the L4 is Hi, and connects the input terminal M to the output terminal when the L4 is Lo. Here, the L4 is determined such that it becomes Lo level when the recording track under scanning by the focus spot is of the hollow portion and it becomes Hi level when the recording track under scanning by the focus spot is of the convex portion. Therefore, only when the focus spot scans on a track of the hollow portion, a polarity of the second tracking error signal E2 is inverted by the inverter 250 and the result is inputted to the tracking control circuit 19.

As mentioned above, in the optical disc apparatus of this embodiment, the offset in the tracking error signal developed by the existence of the recording marks on only adjacent recording track on the inner or outer circumference side is cancelled by applying an inverted voltage corresponding to the offset voltage to the error signal E1 by the offset application circuit 56 in accordance with the control signal L3 outputted according to the result judged by the offset judging means 55 as to whether the signal has been recorded only on either of two recording regions adjacent in the vertical direction to the track direction. This enables the stable tracking control.

Moreover, it can be detected with a simple structure whether the signal has been recorded on only either of two adjacent recording regions by storing addresses of regions where the recording has been carried out up to now in the recorded address control memory 51.

Then an optical disc apparatus of a second embodiment of the invention will be described.

Figure 6:
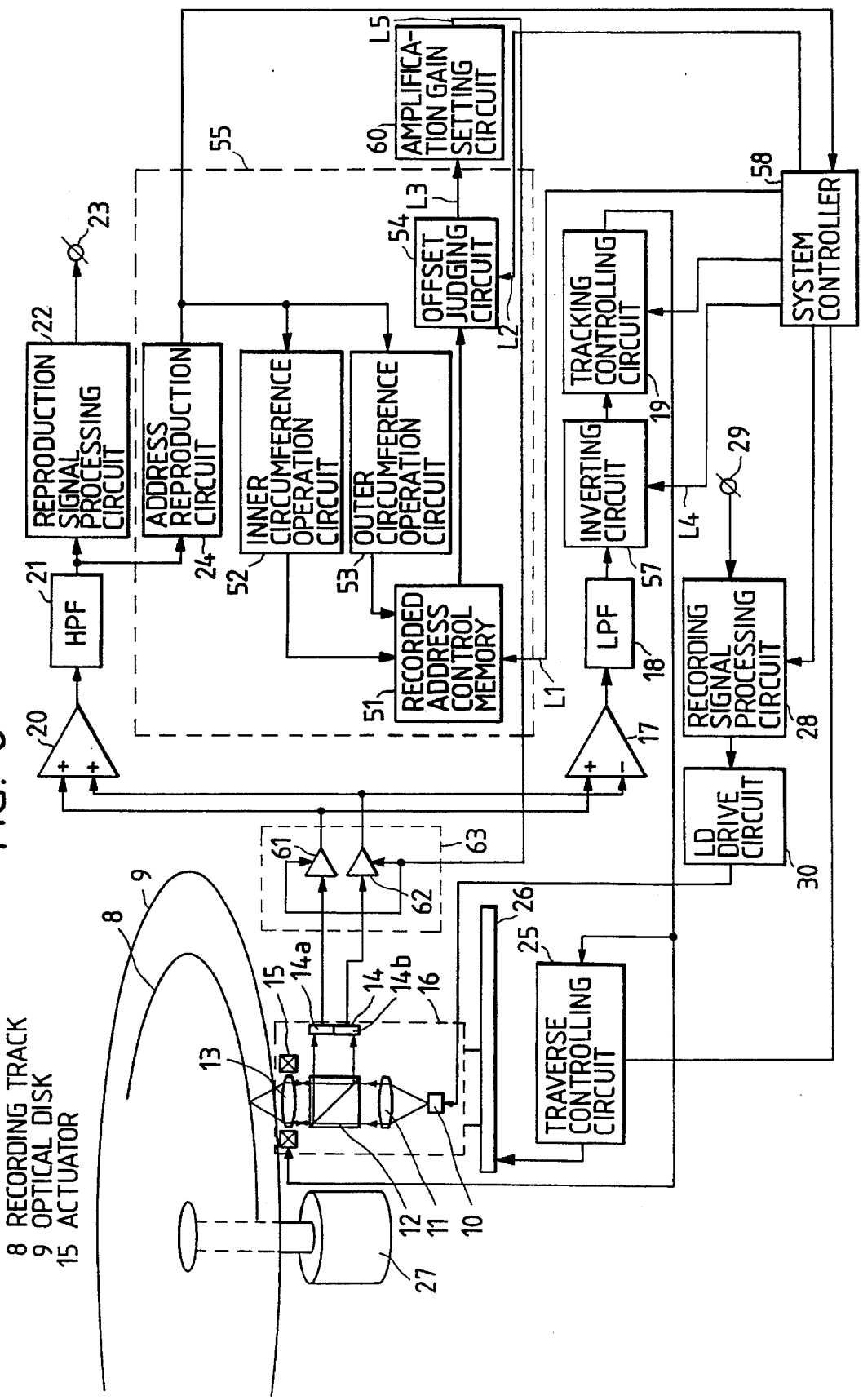
FIG. 6 is a block diagram of the second embodiment concerning to an optical disc apparatus of the invention.

FIG. 6 is a block diagram of an optical disc apparatus of the second embodiment of the invention. In FIG. 6, the structure is the same as the optical disc apparatus of the first embodiment shown in FIG. 1 except an amplification gain setting circuit 60, a first voltage controlled amplifier 61, and a second voltage controlled amplifier 62. That is, this embodiment has the structure including the amplification gain setting circuit 60, the first voltage controlled amplifier 61, and the second voltage controlled amplifier 62 as the offset compensation means 63 in place of the offset application circuit 56 described in the first embodiment (refer FIG. 1). The structure of this portion will be described. The amplification gain setting circuit 60 supplied with the control signal L3 from the offset judging circuit 54 supplies a control voltage L5 to the voltage controlled amplifier 62 and to the second voltage controlled amplifier 62 mentioned later. The first voltage control amplifier 61 supplied with a photodetection signal from the first photodetection portion 14a supplies an output to the differential amplifier 17 and the summing amplifier 20. The second voltage controlled amplifier 62 supplied with the photodetection signal from the second photodetection portion 14b supplies an output to the differential amplifier 17 and the summing amplifier 20. These elements 60, 61, and 62 forms the compensation means 63.

An operation of the optical disc apparatus of this embodiment having the structure mentioned above will be described but only portion different from the optical disc apparatus of the first embodiment shown in FIG. 1, that is, the offset compensation means 63 will be described with reference to FIG. 6. The amplification gain setting circuit 60 is supplied with the control signal L3 from the offset judging circuit 54. The amplification gain setting circuit 60 outputs a controlling voltage through L5 such that when the voltage of the L3 is −V1, an amplification gain of the first voltage controlled amplifier 61 becomes A1 and an amplification gain of the second voltage controlled amplifier 62 becomes A2. Further, it outputs the controlling voltage through the L5 such that when the voltage of the L3 is −V2, the amplification gain of the first voltage controlled amplifier 61 becomes A2 and an amplification gain of the second voltage controlled amplifier 62 becomes A1. Moreover, it outputs the controlling voltage through the L5 such that when the voltage of the L3 is zero, the amplification gains of both voltage controlled amplifiers 61 and 62 become A1.

Here, a ratio between A1 and A2 is previously set to be an inverse of a ratio between amounts of detection signals detected by the photodetection portions 14a and 14b respectively when the recording marks exist on only adjacent recording track on inner circumference side. That is, it is assumed that photocurrents (which are proportional to integers of light intensities of the reflection light ray) generated by the photodetection portions 14a and 14b in the case shown in FIGS. 19(b) and (c) are Ia and Ib. Then, A1 and A2 are set to satisfy the following equations:

$$A2:A1=Ia:Ib \therefore A2 \cdot Ib = A1 \cdot Ia \qquad (EQ. 1)$$

Then, if the recording has been carried out on only recording track on the inner circumference side of the focus spot, the offset judging circuit 54 supplies −V1 to the amplification gain setting circuit 60 through the L3. The amplification gain setting circuit 60 sets the gain of the voltage controlled amplifier 61 to A1 and sets the gain of the voltage controlled amplifier 62 to A2 through the L5 when it detects this voltage with a comparator or the like. The photocurrents inputted to the voltage controlled amplifiers 61 and 62 are Ia and Ib respectively, so that outputs of the respective voltage controlled amplifiers are proportional to A1·Ia and A2·Ib which are equal each other as shown in EQ.1. On the other hand, if the recording has been carried out on only recording track on the outer circumference side of the focus spot, the offset judging circuit 54 supplies −V2 to the amplification gain setting circuit 60 through the L3. When the amplification gain setting circuit 60 detects this voltage with the comparator or the like, it sets the gain of the voltage controlled amplifier 61 to A2 and the gain of the voltage controlled amplifier 62 to A1 through the L5. The photocurrents inputted to the voltage controlled amplifiers 61 and 62 are Ib and Ia contrary to the former case. Therefore, outputs of respective voltage controlled amplifiers are proportional to A2·Ib and A1·Ia. In this case, both are equal each other also. As mentioned above, the output signals from the first voltage controlled amplifier 61 and the second voltage controlled amplifier 62 are equal each other (in the case of no tracking error), so that the offset in the tracking error signal due to the presence of the recording mark only on the adjacent recording track on the inner or outer circumference side can be eliminated.

As mentioned above, in the optical disc apparatus of this embodiment, the offset in the tracking error signal developed due to the presence of the recording marks only on the adjacent recording track on the inner or outer circumference side can be cancelled by that the offset judging means 55 judges whether the recording has been only on either of two recording regions adjacent in the vertical direction to the track direction and that the amplification gain setting circuit 60 switches gains of the first voltage controlled amplifier 61 and the second voltage controlled amplifier 62 on the basis of the control signal L3 outputted in accordance with the judged result. This provides a stable tracking control.

Moreover, because the offset is cancelled by changing the gain of the detection signals from the photodetection portions 14a and 14b of the photodetector 14, so that if there is a change in total light amount received by the photodetector 14 due to a change in the reflectivity or the like on the optical disc 9, the offset can be cancelled in the similar manner, which is a superior effect.

Figure 7:
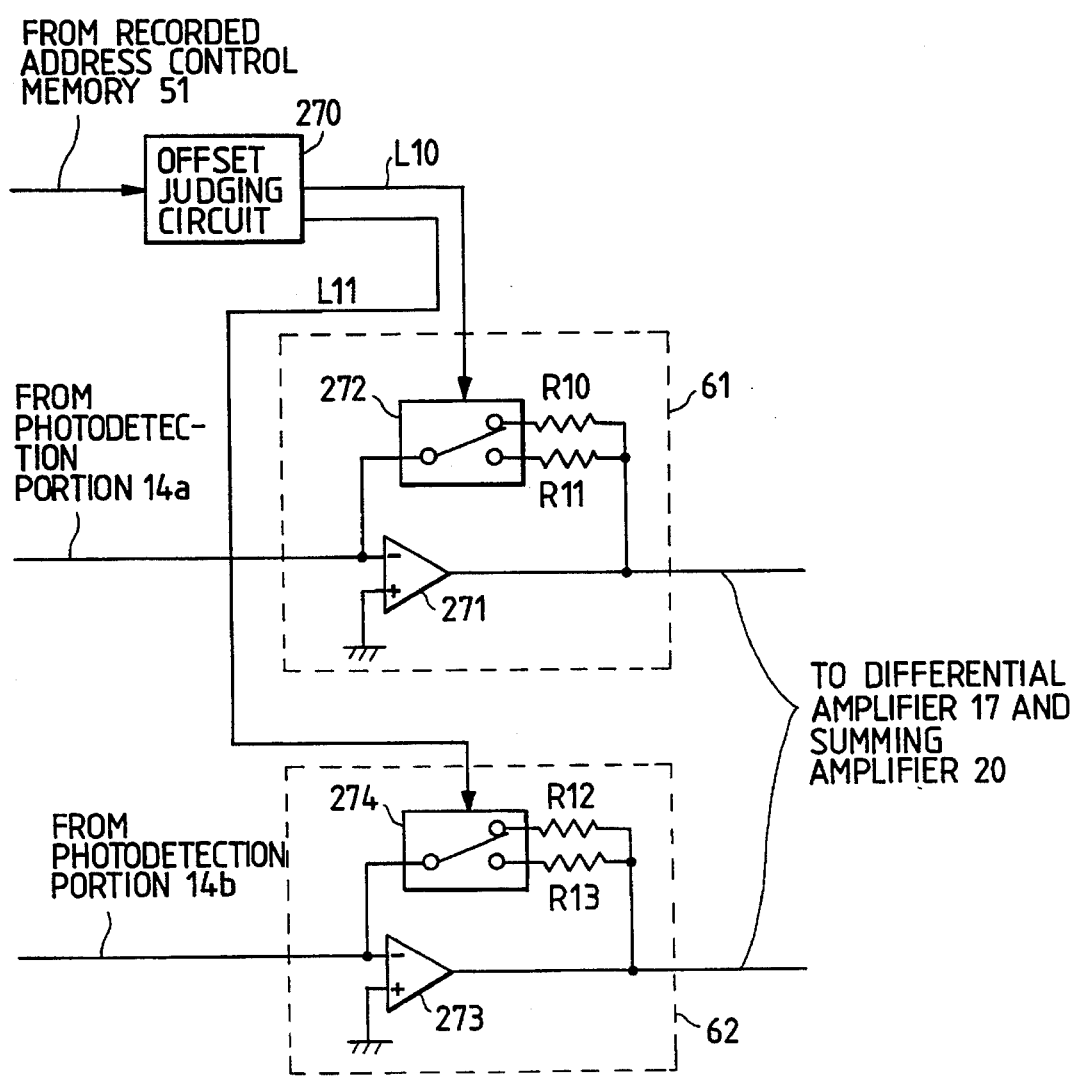
FIG. 7 is a drawing for showing structure of main portions of the same embodiment.

Further, in this embodiment, the amplification gain setting circuit 60 once converts −V1 and −V2 outputted by the offset setting circuit 54 as the L3 into the control voltage L5 and then, the gains of the voltage controlled amplifier 61 and 62 is controlled. However, it is possible that the offset judging circuit 60 directly supplies the control voltage to the voltage controlled amplifiers 61 and 62 in accordance with the flag information data obtained from the recorded address control memory. For example, a structure as shown in FIG. 7 can be considered. In FIG. 7, an offset judging circuit 270 which is different from the case mentioned above, supplies binary signals L10 and L11 having Hi and Lo levels to the voltage controlled amplifiers 61 and 62 respectively. If the recording has been carried out only on the recording track on the inner side of the focus spot, the L10 becomes Hi level and the L11 becomes Lo level. Moreover, if the recording has been carried out only on the recording track on the outer side of the focus spot, the L10 becomes Lo level and the L11 becomes Hi level. In neither case, both L10 and L11 become Hi level. The voltage controlled amplifier 61 comprises an OP amplifier 271, a selector 272, resistors R10 and R11. When R10 acts as a feedback resistor, the gain is A1. When R11 acts as a feedback resistor, the gain is A2. The selector 272 selects R10 when the L10 is Hi and selects when the L10 is Lo level. On the other hand, the voltage controlled amplifier 62 comprises an OP amplifier 273, a selector 274, resistors R12 and R13 wherein R12=R10 and R13=R11. The selector 274 selects R12 when L11 is Hi and selects R11 when the L11 is Lo level. Therefore if the recording has been carried out only on the recording track on the inner circumference side of the focus spot, the gains of the voltage amplifiers 61 and 62 are set to A1 and A2. Moreover, if the recording has been carried out only on the recording track on the outer circumference side of the focus spot, the gains of the voltage amplifiers 61 and 62 are set to A2 and A1. Further, neither case, the gains of both voltage controlled amplifiers 61 and 62 become A1. This eliminates the offset in the tracking error signal as mentioned above.

Then a third embodiment of an optical disc apparatus of this invention will be described.

Figure 8:
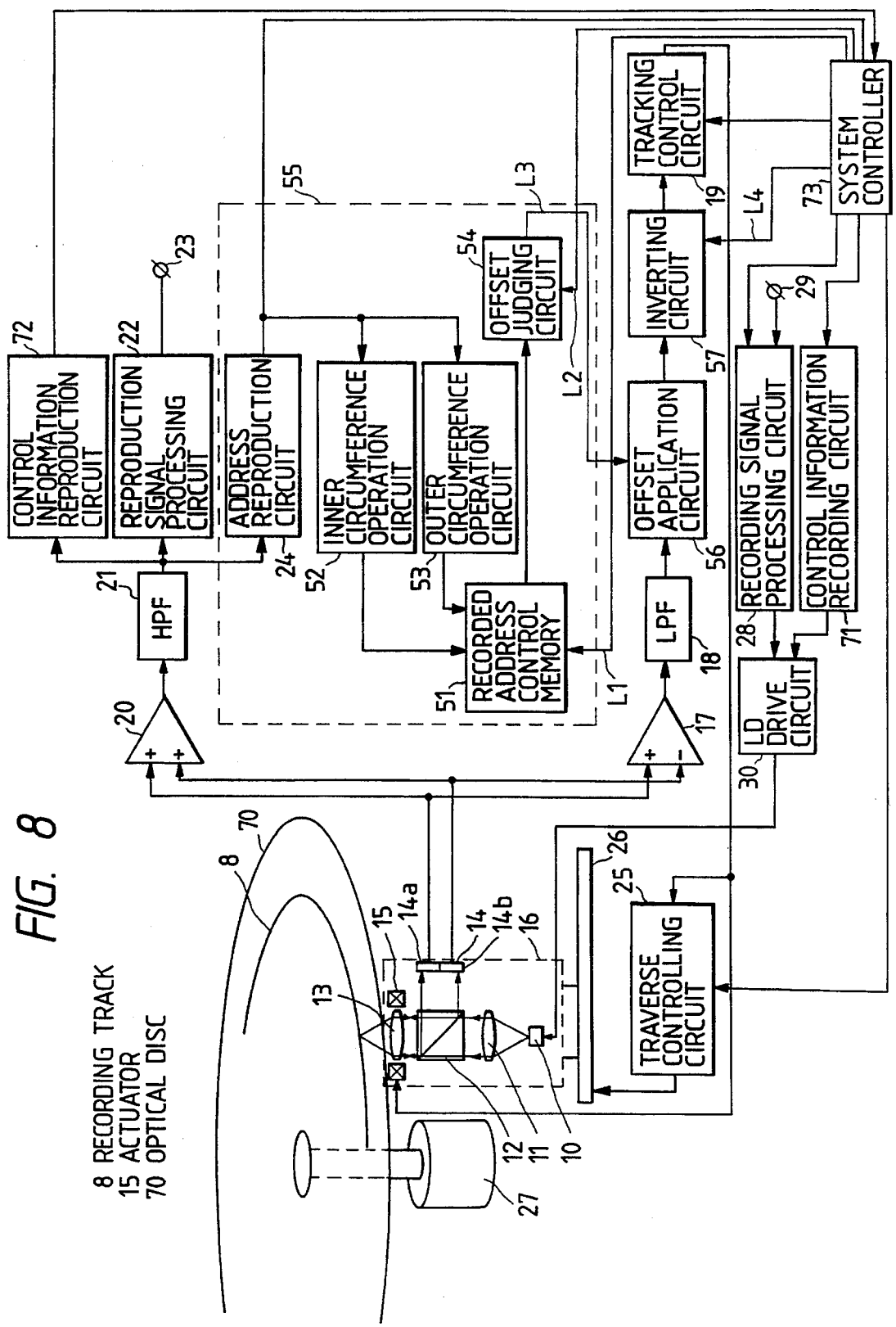
FIG. 8 is a block diagram of a third embodiment concerning to an optical disc apparatus of the invention.
Figure 9:
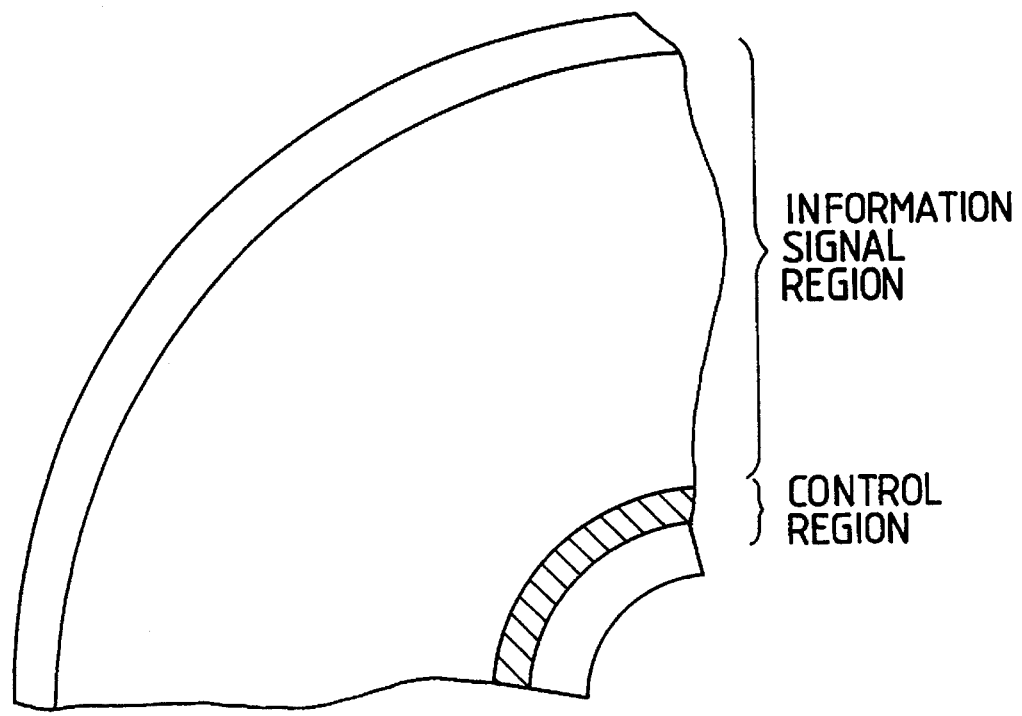
FIG. 9 is a plan view for showing divisions in recording regions of the optical disc 70 in the same embodiment.

FIG. 8 is a block diagram of the third embodiment of the optical disc apparatus of the invention. In FIG. 8, the structure is the same as the optical disc apparatus of the first embodiment shown in FIG. 1 except an optical disc 70, a control information recording circuit 71, a control information reproduction circuit 72, and system controller 73. That is, this embodiment has the structure that the optical disc 70 is provided in place of the optical disc 9 described in the first embodiment, the system controller 73 is provided in place of the system controller 58, and the control information recording circuit 71 and the control information reproduction circuit 72 are added. Numeral 70 is the optical disc to which a control region for recording addresses of recorded regions on the optical disc is provided. FIG. 9 is a plan view for showing a portion of such optical disc 70. As shown in FIG. 9, the control region for recording addresses of the recorded regions is provided at an information recording track on the inner circumference side of the disc. All track numbers and all sector numbers of the optical disc 70 where the recording has been carried out are recorded in the control region. In FIG. 8, the control information recording circuit 71 supplied with a writing address signal and a control signal from the system controller 73 supplies a recording signal to the LD drive circuit 30. The control information reproduction circuit 72 supplied with a reproduction signal from the HPF 21 supplies a recorded address information to the system controller 73. The system controller comprises a microcomputer or the like.

A portion of operations of the optical disc apparatus of this embodiment structured as mentioned above which is different from the optical disc apparatus of the first embodiment shown in FIG. 1 with reference to FIG. 8. Operations of this embodiment which are different from the first embodiment are mounting and removal operations. Those operations will be described.

At first, the mounting operation of the optical disc 70 where the recording has not been carried out is the same as the first embodiment.

Then, on the removal operation after the information signal is recorded in the optical disc 70, the system controller 73 supplies the addresses of the recorded regions which have been recorded to the control information recording circuit 71 as the recorded address information. The control information recording circuit 71 converts this into a signal to be recorded at the control region on the optical disc 70 and supplies it as a recording signal to the LD drive circuit 30. The control information recording circuit 71 only effects modulation to the address signal to continuously record the recorded addresses on the optical disc 70 and thus, in the control information recording circuit 71 the essentially the same technique as the conventional recording signal processing circuit is used. At the same time, the system controller 73 moves the light beam to the control region provided on the optical disc 70 through the traverse control circuit 25 and the tracking control circuit 19. The LD drive circuit 30 records the recorded address information on the control region in accordance with the inputted recording signal. After completion of these operations, the optical disc 70 is removed.

Moreover, when the optical disc 70 where the information signal has been recorded is mounted, before the beginning of recording or reproducing of the optical disc 70, at first, the system controller 73 moves the light beam to the control region provided on the optical disc 70 through the traverse control circuit 25 and tracking control circuit 19 and reproduces the signal recorded on the control region. This reproduction signal via the photodetector 14, the summing amplifier 20, and HPF 21 is decoded to the recorded address information by the control information reproduction circuit 72 and supplied to the system controller 73. The control information reproduction circuit 72 only decodes the recorded address information recorded on the control region, that is, it is provided through the conventional technique similar to the address reproduction circuit 24. The system controller 73 supplies the address signal and the flag information data in accordance with the recorded address information to the recorded address control memory 51 and makes all flags corresponding to the recorded addresses Hi. This provides a map of the flag information indicative of the recorded addresses of the optical disc 70 in the recorded address control memory 51. After this, as similar to the first embodiment mentioned above, the compensation of the tracking offset is effected in accordance with the map of the recorded control memory 51.

As mentioned above, in addition to the advantage effect of the first embodiment, the optical disc apparatus of this embodiment can hold the recorded address information though the optical disc is once removed and thus, the recorded address control memory 51 is reset by that the recorded address information is recorded on the control region of the optical disc 70. Therefore, when the optical disc 70 is mounted again, the tracking offset compensation is possible in accordance with the recorded address information read out from the control region, so that a stable tracking control is carried out.

Moreover, in the control region, in order to increase an accuracy of reading of the recorded address information signal, the recording marks may be recorded on only either of the hollow portion or the convex portion.

Then, an optical disc apparatus of a fourth embodiment of the invention will be described. Here, the recording/reproducing of the information signal is effected from the recording track of an inner circumference side to that of an outer circumference side.

Figure 10:
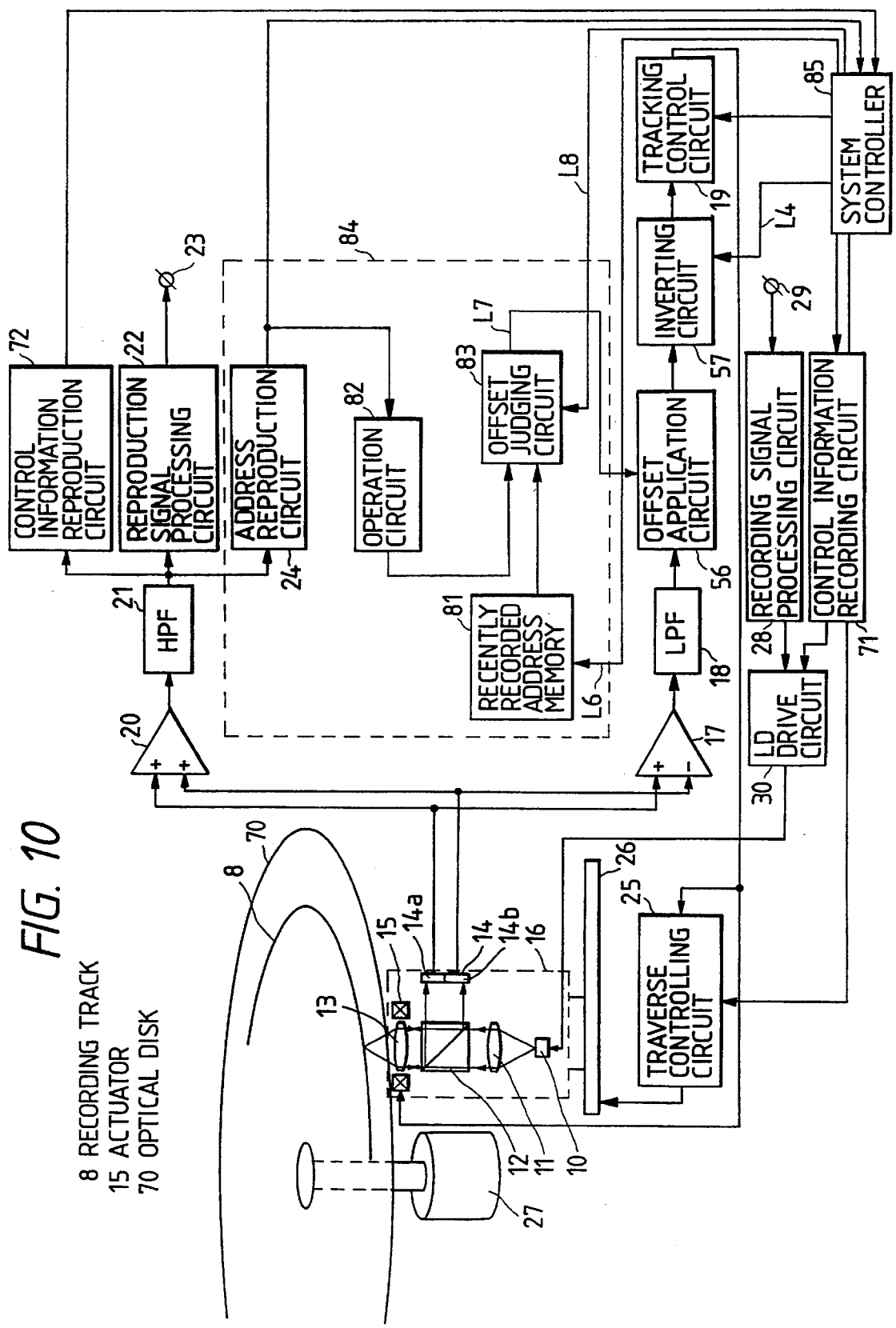
FIG. 10 is a block diagram of a fourth embodiment concerning to an optical disc of the invention.

FIG. 10 is a block diagram of the optical disc apparatus of the fourth embodiment of the invention. In FIG. 10, the structure is the same as the optical disc apparatus of the third embodiment shown in FIG. 8 except numeral 81 which is a recently recorded address memory, numeral 82 which is an operation circuit, numeral 83 which is an offset judging circuit, numeral 84 which is offset discrimination means, numeral 85 which is a system controller. That is, in place of the recorded address control memory 51, the inner circumference address operation circuit 52, the outer circumference address operation circuit 53, the offset judging circuit 54, the offset discrimination means 55, and the system controller 58, the recently-recorded address memory 81, the operation circuit 82, the offset judging circuit 83, the offset discrimination means 84, the system controller 85 are provided.

Structure of these portions will be described. Numeral 81 is a the recently-recorded address memory supplied with an address signal and R/W control signal L6 from the system controller 85 supplies a first address information to the offset judging circuit 83 mentioned later. Numeral 82 is the operation circuit supplied with address information of a position of the light beam currently scanning from the address reproduction circuit 24 supplies second address information to the offset judging circuit 83. Numeral 83 is the offset judging circuit supplied with the first address information from the recently-recorded address memory 81 and the second address information from the operation circuit 82, and the control signal L8 from the system controller 85 supplies a control signal L7 to the offset application circuit 56. Elements mentioned above form the offset judging means 84 together with the address reproduction circuit 24. Numeral 85 is the system controller comprising a microcomputer.

An operation of the optical disc apparatus of this embodiment structured as mentioned above will be described with respect to a different portion from the optical disc apparatus of the third embodiment, that is, the system controller 85 and the offset judging means 84.

At first, the case where the recording is effected to the optical disc 70 in which the recording has not been carried out will be described. When the optical disc 70 is mounted, the system controller 85 moves the light beam to the recording region through the traverse control circuit 25 and the tracking control circuit 19 and reproduces the data recorded on the control region through the optical head 16. Any data has not recorded at the control region since it was assumed that the recording has not been carried out on the optical disc 70. Thus, the system controller 85 detects that the recording has not been carried out on the optical disc 70, and then, moves the optical head to the beginning of the recording track and records the information signal from the begging of the recording track. After this, the system controller 85 controls the traverse control circuit 25, the tracking control circuit 19, and the recording signal processing circuit 28 so as to record the information signal continuously from the recording track of the inner circumference side to that of the outer circumference side. When the recording has been finished, the system controller 85 writes an address of the region where the recording has carried out recently as the recently-recorded address into the recently-recorded address memory 81 through the L6. The recently-recorded address memory 81 is a register for recording the end address of a sector where the recording has been effected most recently on the optical disc 70, so that it should have the capacity for storing a set of a track number and the sector number. Moreover, the system controller 85 records the recently-recorded address on the control region on the optical disc 70 through the control information recording circuit 71 and the LD drive circuit 30.

Then, an operation of the optical disc apparatus of the embodiment will be described in the case that the information signal is reproduced form the optical disc 70 on which the information signal has been recorded as mentioned above. When the optical disc 70 is mounted, the system controller 85 moves the light beam to the control region through the traverse control circuit 25 and the tracking control circuit 19 and reproduces the recently-recorded address recorded on the control region through the optical head 16. The recently-recorded address decoded by the control information reproduction circuit 72 is written into the recently-recorded address memory 81 by the system controller 85. Then, the system controller 85 moves the optical head 16 to the recording track of the desired address and reproduces the information signal. After this, the system controller 85 controls the traverse control circuit 25, the tracking control circuit 19 so as to reproduce the information signal from the recording track of the inner circumference side to that of the outer circumference side. The operation circuit 82 calculates an address value which advances by one rotation from the present address outputted by the address reproduction circuit 24 and supplies the result as a first address information to the offset judging circuit 83. Since this embodiment employs CAV, the address advancing by one rotation is obtained by increment of the track number out of the track number and the sector number by one. The recently-recorded address memory 81 supplies the stored address to the offset judging circuit 83 as a second address information. The system controller 85 supplies a control signal L8 to the offset judging circuit 83 at every carry of the present address sent form the address reproduction circuit 24. When the offset judging circuit 83 receives the L8, it compares first and second address information. If the first address information is smaller or equal to the second address information, it judges that the recording has been carried out on both inner and outer circumference sides of the represent address and then, the voltage applied to the offset application circuit 56 through L7 is set to zero volt. On the other hand, the first address information is larger than the second address information, it judges that the recording had been carried out on the inner side circumference side of the present address, a voltage set to the offset application circuit 56 through the L7 to −V1. After the operation of the offset application circuit 56 is similar to the first embodiment.

Figure 11:
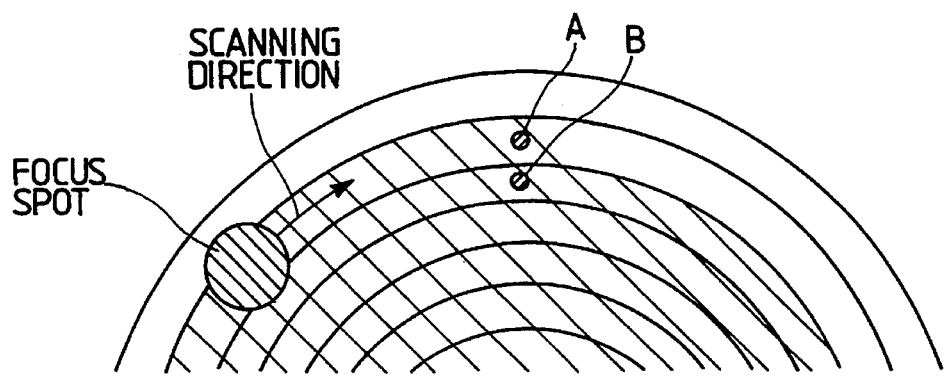
FIG. 11 is a plan view showing tracks on the optical disc in the same embodiment, wherein the recording has been carried out.

Here, the reason why the offset judging means 84 can judge whether or not the recording has been carried out on only either of the adjacent two recording regions will be described. As mentioned earlier, when the information signal is recorded on the optical disc 70, the information signal is continuously recorded from the beginning of the recording track by the controlling by the system controller 85. Therefore, the regions where the recording has not been carried out exist only at the recording tracks after the recently-recorded address. FIG. 11 is an illustration of the recording tracks for explaining that condition. This means that the track offset occurs only when the light beam scans from the recently-recorded address to a one-rotation-behind address. Further, there is only one case that the recording has been carried out only on the inner circumference side. Therefore, it is sufficient that the offset judging circuit 83 supplies −V1 to the offset application circuit 56 through the L7 only on the period when the light beam scans between the recently-recorded address to the one-rotation-behind address. Therefore, it can judge whether or not the signal has been recorded only on either of two adjacent recording regions by comparing the address which advances by one-rotation from the present address (corresponding to the first address information) with the recently-recorded address (corresponding to the second address information).

Figure 12:
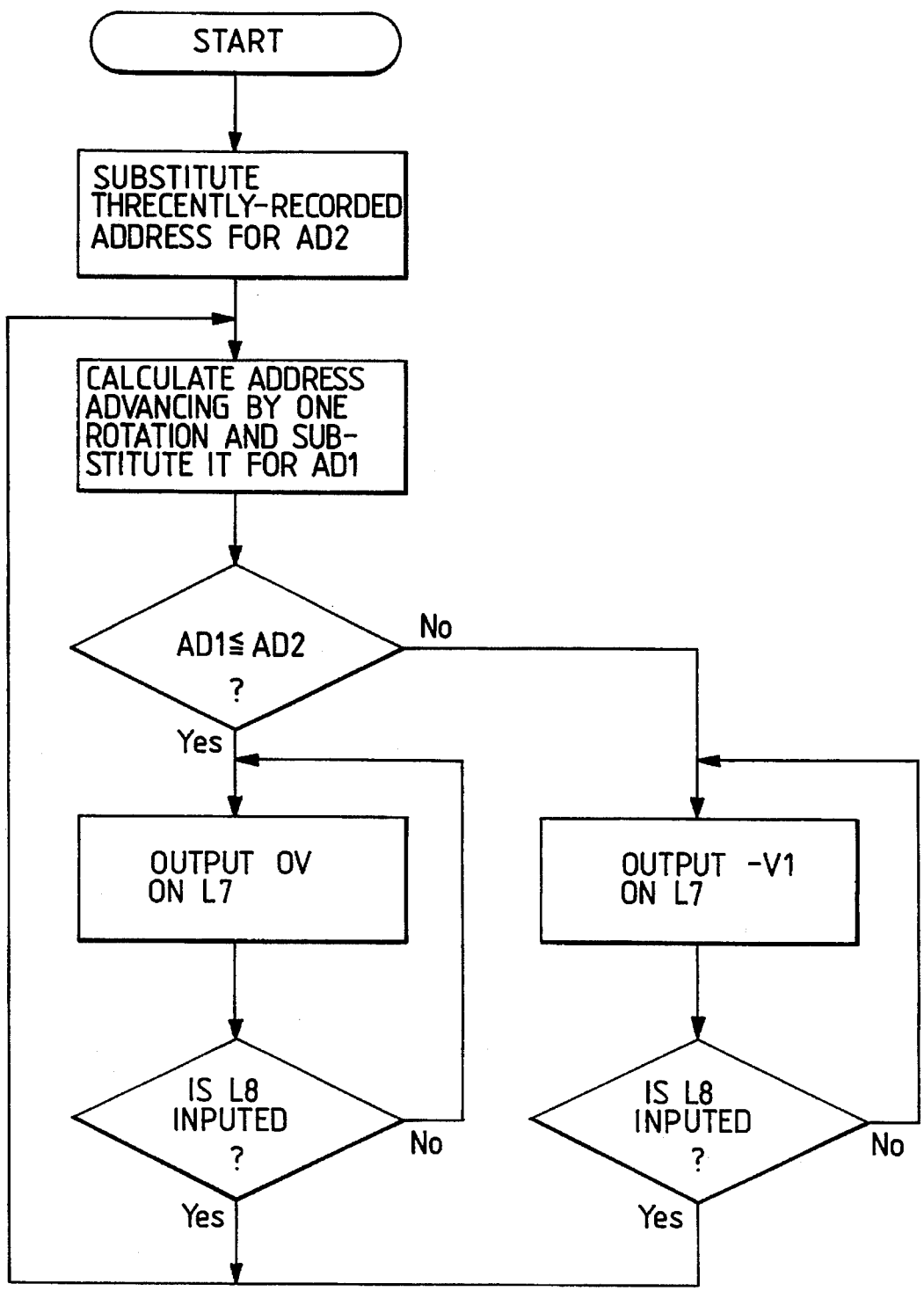
FIG. 12 shows a flow chart for explaining an operation of a microcomputer forming the main portions in the same embodiment.
Figure 14:
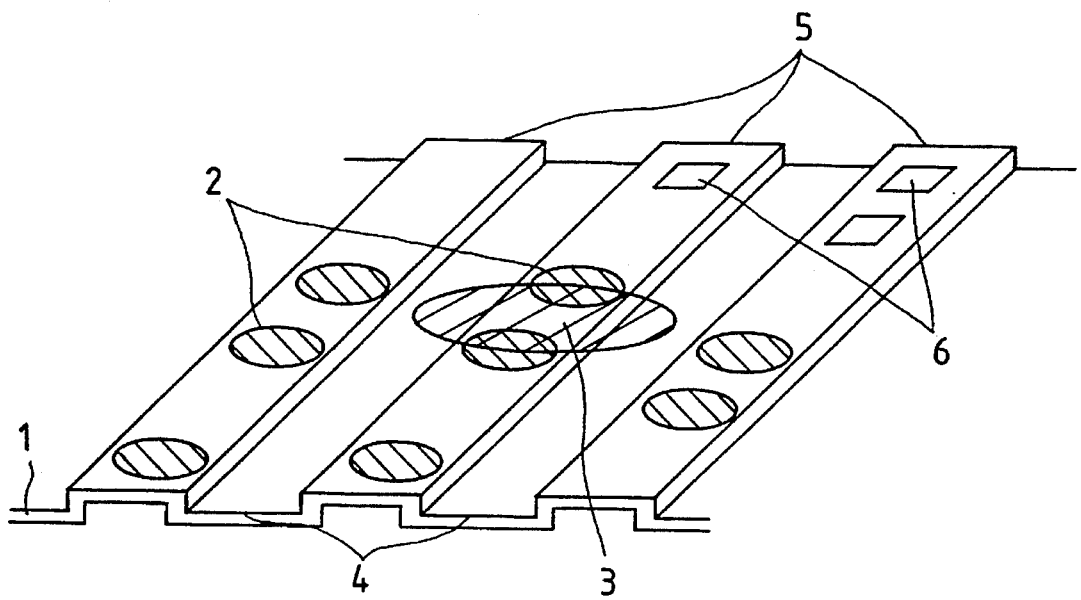
FIG. 14 is an enlarge perspective view for explaining a structure of an optical disc used in a prior art optical disc.

The operation circuit 82 and the offset judging circuit 83 can be structured with incorporation of them using a microcomputer. FIG. 12 is a flow chart for explaining an operation of the microcomputer. In this flow chart, it is assumed that the register for storing the first address information is AD1 and the register for storing the second address information is AD2. With a simple algorithm as shown in FIG. 12, an appropriate voltage can be applied to the offset application circuit 56.

As mentioned above, the optical disc apparatus of this embodiment, because in the the optical disc 70 the information signal is recorded from the begging of the recording track under the recording control by the system controller 85, the track offset occurs only from the recently-recorded address to the address which is one rotation behind. Therefore, it is unnecessary to compensate the offset frequently, so that the tracking control is further stabilized.

Moreover, the address which the recently-recorded address memory 81 should store is only the recently-recorded address, so that a capacity of the memory can be staved. Further the control region on the disc made small, so that the recording capacity of the information signal can be increased relatively.

Figure 13:
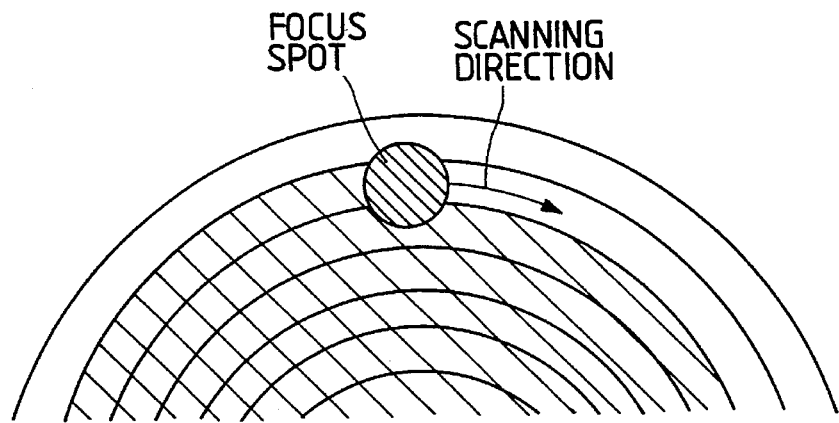
FIG. 13 is a plan view showing a region of tracks on the optical disc in the same embodiment wherein the recording has been effected.

Moreover, in the description mentioned above, the operation for reducing the DC offset of the tracking error signal was described only with respect to the reproduction of the information signal. However, on the recording, the DC offset can be reduced simply also. In this embodiment, the information signal is continuously recorded from the beginning of the recording track in the optical disc 70, so that when the information signal is recorded, the recording marks have been recorded on the recording track on the inner circumference side of the focus spot and no recording mark has been recorded on the recording track on the outer circumference side of the focus spot. FIG. 13 is a plan view for explaining the condition of recorded regions of the optical disc 70 when the information signal is recorded in this embodiment. The DC offset of the tracking error signal occurs during the recording is always V1. The system controller 85 controls the offset judging circuit 83 to supply the voltage −V1 to the offset application circuit 56 through the control signal L7 when the information signal is recorded. This also cancels the DC offset V1 in the tracking error signal always by the offset application circuit 56 when the information signal is recorded.

Moreover, in this embodiment, it was assumed that the light beam moves from the inner side circumference to the outer circumference. However, it is possible that the light beam moves from the outer circumference side to the inner circumference side. In this case, because there is only the case that the recording has not been carried out on the inner circumference side, the voltage −V2 is applied to the offset voltage application circuit 56 through L7.

This invention is not limited with the embodiments mentioned above and there are variable possible modifications. For example, the guide groove is not limited to the spiral but may be coaxial. Further, the rotating control method of the disc is CAV. However, this invention is basically applicable to the constant linear velocity (CLV: Constant Liner Velocity), or a combination of the CAV and CLV. Moreover, in the above-mentioned first, second, third, and fourth embodiments, the push-pull method is used as the tracking error detection means. However, a method where the offset occurs in the error signal due to the recording on the adjacent track, such as the three beam method or the like may be applicable to this embodiment. Moreover, the address of the recorded region is stored as the offset judging means. It is possible that a sub-light-beams for confirming that the recording has been carried out are emitted to the adjacent recording track on both sides and it can be judged whether the recording has been carried out through change in intensity of the reflected light. In this case, the judgement whether the recording has been carried out can be made real time, so that there is a superior advantage effect that a surer compensation of the tracking offset is provided.

INDUSTRIAL APPLICATIONS

As described in detail, the optical disc apparatus of this invention provides a stable tracking control because the judging means detects that the recording has been carried out only on either recording region of two recording regions adjacent in the vertical direction to the track direction with respect to a position of a scanned light beam applied onto the optical disc while the optical system applies the light beam onto the recording track and then, the tracking error detection means compensates the error signal outputted by the tracking error detection means in accordance with the output of the judging means.

Moreover, the judging means can detect that the signal has been recorded on only either of two adjacent recording regions from the address of the recorded region stored in the storing means and the present address detected by the address detection means. Therefore, no special sensor is required for directly detecting whether the recording pits exist on the adjacent recording regions, so that the simplification of the apparatus can be obtained.

Moreover, with a simple structure, the offset of the tracking error signal can be eliminated by that the compensation means adds the offset amount to the tracking error signal outputted by the differential amplifier in accordance with the output of the judging means.

Further, the offset of the tracking error signal outputted by the differential amplifier can be eliminated by hat the compensation means amplifies at least two detection signals outputted from the photodetection means at respective different amplification gains in accordance with outputs of the judging means. Moreover, the gain of each detection signal is changed before the differential operation, so that there is a superior advantage effect than an effect due to a change in the reflectivity of the disc can be prevented.

Moreover, the addresses of the recorded regions are written in the control region on the optical disc. Therefore, the tracking offset can be eliminated in accordance with the address information stored in the control region because though the stored content in the recording means is erased when the optical disc is once removed from the apparatus, the address information stored in the control region can be obtained when the recording or reproduction at the next operation is carried out.

Further, the recording control means records the information signal continuously from the beginning of the recording track, so that the track offset occurs only while the light beam scans from the recently-recorded address to the one-rotation-behind address. Therefore, it is unnecessary to compensate the offset frequently, so that the tracking control can be stabilized further.

We claim:

1. An optical disc apparatus comprising:
    an optical disc, having recording tracks including hollow and convex portions formed by a guide groove on said optical disc, for recording an information signal using a change in a local optical constant or a physical shape by the application of a light beam;

an optical system for applying a light beam generated by a light source onto said optical disc, wherein said light beam forms a scanning spot on the optical disc that covers a width of a recording track and a portion of each of two adjacent tracks;

photodetection means for detecting the light beam, after at least one of reflection from the optical disc and transmission through the optical disc, and generating an output signal;

first moving means for moving said light beam applied to said optical disc in a direction perpendicular to a direction of said recording track;

second moving means for relatively moving said light beam applied to said optical disk in said direction of said recording track;

tracking error detection means for receiving said output signal from said photodetection means and detecting an amount of deviation between a position of the light beam applied to said optical disc and the recording track in a direction perpendicular to the direction of said track, wherein said tracking error detection means outputs a tracking error signal corresponding to the amount of deviation;

tracking controlling means for controlling the first moving means in response to said tracking error signal such that said scanning spot is substantially centered on the recording track;

judging means for judging whether the information signal has been recorded on either of said two adjacent tracks in the portions of the two adjacent tracks that are covered by the scanning spot, and generating a compensation signal when the information signal has been recorded on only one of the two adjacent tracks in the portion covered by the scanning spot; and compensation means for eliminating a DC offset in the tracking error signal outputted by said tracking error detection means in response to the compensation signal generated by said judging means.

2. An optical disc apparatus as claimed in claim 1, wherein said judging means at least comprises:

address detection means for detecting a present address where the light beam applied to the optical disc scans; and storing means for storing addresses of regions of said optical disc where recording of the information signal has been carried out.

3. An optical disc apparatus as claimed in claim 1, wherein said photodetection means includes photodetectors that output at least two detection signals, which are approximately proportional to amounts of received light, and said tracking error detection means includes a differential amplifier for outputting a difference signal between said at least two detection signals, and wherein said compensation means adds an amount of offset in response to the compensation signal generated by the judging means to the difference signal outputted by the differential amplifier of said tracking error detection means.

4. An optical disc apparatus as claimed in claim 1, wherein said photodetection means includes photodetectors that output at least two detection signals, which are approximately proportional to amounts of received light, and said tracking error detection means includes a differential amplifier for outputting a difference signal between said at least two detection signals, and wherein said compensation means amplifies or attenuates said two detection signals outputted by said photodetectors of said photodetection means with respective amplification gains changed in response to the compensation signal generated by the judging means, and supplies the amplified or attenuated detection signals to said differential amplifier.

5. An optical disc apparatus as claimed in claim 1, further comprising a control region provided at a specific region on the optical disc for recording addresses of regions recorded with said information signal.

6. An optical disc apparatus as claimed in claim 1, further comprising recording controlling means for continuously recording the information signal from the beginning of the recording track.

7. An optical disc apparatus as claimed in claim 2, wherein said photodetection means includes photodetectors that output at least two detection signals, which are approximately proportional to amounts of received light, and said tracking error detection means includes a differential amplifier for outputting a difference signal between said at least two detection signals, and wherein said compensation means adds an amount of offset in response to the compensation signal generated by the judging means to the difference signal outputted by the said tracking error detection means.

8. An optical disc apparatus as claimed in claim 2, wherein said photodetection means includes photodetectors that output at least two detection signals, which are approximately proportional to amounts of received light, and said tracking error detection means includes a differential amplifier for outputting a difference signal between said at least two detection signals, and wherein said compensation means amplifies or attenuates said two detection signals outputted by said photodetectors of said photodetection means with respective amplification gains changed in response to the compensation signal generated by the judging means and supplies the amplified or attenuated detection signals to said differential amplifier.

9. An optical disc apparatus as claimed in claim 2, further comprising a control region provided at a specific region on the optical disc for recording addresses of regions recorded with said information signal.

10. An optical disc apparatus as claimed in claim 3, further comprising a control region provided at a specific region on the optical disc for recording addresses of regions recorded with said information signal.

11. An optical disc apparatus as claimed in claim 4, further comprising a control region provided at a specific region on the optical disc for recording addresses of regions recorded with said information signal.

12. An optical disc apparatus as claimed in claim 2, further comprising recording controlling means for continuously recording the information signal from the beginning of the recording track.

13. An optical disc apparatus as claimed in claim 3, further comprising recording controlling means for continuously recording the information signal from the beginning of the recording track.

14. An optical disc apparatus as claimed in claim 4, further comprising recording controlling means for continuously recording the information signal from the beginning of the recording track.

15. An optical disc apparatus as claimed in claim 5, further comprising recording controlling means for continuously recording the information signal from the beginning of the recording track.

16. An optical disc apparatus as claimed in claim 1, wherein said judging means includes an address reproduction circuit coupled to said photodetection means, an operation circuit coupled to said address reproduction circuit, a recently recorded address memory, and an offset judging circuit coupled to said operation circuit and said recently recorded address memory.

17. An optical disc apparatus as claimed in claim 1, wherein said judging means includes:

an address reproduction circuit, coupled to said photodetection means, for supplying an address signal; a recently recorded address reproducing means for reproducing a recently recorded address recorded on said optical discs; and a recently recorded address memory for storing said recently recorded address received from said recently recorded address reproducing means; and wherein said judging means judges whether the information signal has been recorded on either of said two adjacent tracks in portions of the two adjacent tracks that are covered by the scanning spot when the scanning spot is formed on the optical disc between said recently recorded address and a one-rotation-behind address using said address signal and said recently recorded address from said recently recorded address memory.

* * * * *